(12) United States Patent
Mildh et al.

(10) Patent No.: US 11,032,715 B2
(45) Date of Patent: *Jun. 8, 2021

(54) SECURITY HANDLING FOR RRC RESUME FROM INACTIVE STATE

(71) Applicant: TELEFONAKTIEBOLAGET LM ERICSSON (PUBL), Stockholm (SE)

(72) Inventors: Gunnar Mildh, Sollentuna (SE); Icaro L. J. da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/103,401

(22) Filed: Nov. 24, 2020

(65) Prior Publication Data

US 2021/0076198 A1 Mar. 11, 2021

Related U.S. Application Data

(63) Continuation of application No. 16/721,410, filed on Dec. 19, 2019, which is a continuation of application
(Continued)

(51) Int. Cl.
*H04W 12/60* (2021.01)
*H04W 12/037* (2021.01)
(Continued)

(52) U.S. Cl.
CPC ......... *H04W 12/60* (2021.01); *H04W 12/037* (2021.01); *H04W 12/041* (2021.01);
(Continued)

(58) Field of Classification Search
CPC . H04W 12/60; H04W 12/037; H04W 12/041; H04W 80/08; H04W 76/19; H04W 76/18; H04W 76/27; H04W 92/10
See application file for complete search history.

(56) References Cited

U.S. PATENT DOCUMENTS 9,155,121 B2   10/2015 Rayavarapu
10,667,323 B1*  5/2020 Shih ............... H04W 76/30
(Continued)

OTHER PUBLICATIONS

"CR on Connection Control ([101#37][NR] RRC procedures/messages)", 3GPP TSG-RAN WG2 #101Bis, Tdoc R2-180xxxx, Apr. 11, 2018.
(Continued)

*Primary Examiner* — Darren B Schwartz

(57) ABSTRACT

A communication system including a host computer is provided herein. The host computer may include processing circuitry configured to provide user data and a communication interface configured to forward the user data to a cellular network for transmission to a user equipment (UE). The cellular network comprises a base station having a radio interface and base station processing circuitry. The base station processing circuitry configured to store a previously active security context for the UE, receive from the UE an RRC Resume Request message including a security token, generate a temporary security context for the UE, use the temporary security context to verify the security token, send an RRC message to the UE, if no response to the RRC message is received from the UE, discard the temporary security context and retrieve the previously active security context. Thereafter, the base station transmits the user data for a host application.

25 Claims, 20 Drawing Sheets

Related U.S. Application Data

No. 16/386,077, filed on Apr. 16, 2019, now Pat. No. 10,555,168.

(60) Provisional application No. 62/657,967, filed on Apr. 16, 2018.

(51) Int. Cl.

| | | |
|---|---|---|
| *H04W 12/041* | (2021.01) | |
| *H04W 80/08* | (2009.01) | |
| *H04W 76/19* | (2018.01) | |
| *H04W 76/18* | (2018.01) | |
| *H04W 76/27* | (2018.01) | |
| *H04W 92/10* | (2009.01) | |

(52) U.S. Cl.
CPC ........... *H04W 76/18* (2018.02); *H04W 76/19* (2018.02); *H04W 76/27* (2018.02); *H04W 80/08* (2013.01); *H04W 92/10* (2013.01)

(56) References Cited

U.S. PATENT DOCUMENTS

| | | | | |
|---|---|---|---|---|
| 10,880,947 | B2* | 12/2020 | Wikstrom | H04W 76/19 |
| 2004/0253946 | A1* | 12/2004 | Gibbs | H04W 76/19 |
| | | | | 455/422.1 |
| 2009/0061855 | A1* | 3/2009 | Sethi | H04W 76/22 |
| | | | | 455/432.2 |
| 2012/0063300 | A1* | 3/2012 | Sahin | H04W 36/12 |
| | | | | 370/225 |
| 2012/0082105 | A1 | 4/2012 | Hwang | |
| 2013/0028097 | A1 | 1/2013 | Barrett | |
| 2013/0039287 | A1 | 2/2013 | Rayavarapu | |
| 2013/0208699 | A1* | 8/2013 | Hakkinen | H04W 76/38 |
| | | | | 370/331 |
| 2013/0260810 | A1* | 10/2013 | Rayavarapu | H04W 76/19 |
| | | | | 455/509 |
| 2016/0278160 | A1* | 9/2016 | Schliwa-Bertling | |
| | | | | H04W 72/048 |
| 2017/0013453 | A1 | 1/2017 | Lee | |
| 2018/0022486 | A1 | 1/2018 | Pallotta | |
| 2018/0206080 | A1 | 7/2018 | Chen | |
| 2018/0213575 | A1 | 7/2018 | Chen | |
| 2018/0220487 | A1 | 8/2018 | Wu | |
| 2018/0302944 | A1* | 10/2018 | Chang | H04W 76/19 |
| 2019/0037629 | A1* | 1/2019 | Ryu | H04W 8/08 |
| 2019/0045482 | A1* | 2/2019 | Lee | H04W 76/27 |
| 2019/0052607 | A1* | 2/2019 | Ohlsson | H04W 76/28 |
| 2019/0159278 | A1* | 5/2019 | Takahashi | H04W 52/0222 |
| 2019/0191483 | A1 | 6/2019 | Ryoo | |
| 2019/0200410 | A1* | 6/2019 | Hoglund | H04W 68/005 |
| 2019/0208411 | A1* | 7/2019 | Shrestha | H04L 9/3242 |
| 2019/0357296 | A1* | 11/2019 | Ohlsson | H04W 76/27 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331, V 15.1.0., Mar. 2018.

Ericsson, "NR RRC States overview and remaining open issues", 3GPP TSG-RAN WG2 #100, Tdoc R2-1713301, Nov. 17, 2017.

Ericsson, "NR RRC States overview and remaining open issues", 3GPP TSG-RAN WG2 #101, Tdoc R2-1802361, Feb. 26-Mar. 2, 2018, Athens, Greece.

Ericsson, "NR RRC States overview and remaining open issues", 3GPP TSG-RAN WG2 NR Ad Hoc, Tdoc R2-1800419, Jan. 12, 2018.

Ericsson, "Security for Msg3 in early data transmission", 3GPP TSG-RAN WG2 #101, R2-1803074, Feb. 26-Mar. 2, 2018, Athens, Greece.

Huawei et al., "State transition between RRC Connected and Inactive", 3GPP TSG-RAN WG2 Meeting #98, R2-1704884, May 6, 2017.

Intel Corporation, "TP on agreed NR INACTIVE aspects", 3GPP TSG RAN WG2 Meeting #101, R2-1802929, Feb. 16, 2018.

* cited by examiner

RRC connection resume, successful (3GPP TS 38.331 § 5.3.13, Fig. 5.3.13.1-1)**

RRC connection resume fallback to connection establishment, successful (3GPP TS 38.331 § 5.3.13, Fig. 5.3.13.1-2)**

RRC connection resume followed by network release, successful

(3GPP TS 38.331 § 5.3.13, Fig. 5.3.13.1-3)

RRC connection resume followed by network suspend, successful

(3GPP TS 38.331 § 5.3.13, Fig. 5.3.13.1-4)

RRC connection resume, network reject (3GPP TS 38.331 § 5.3.13, Fig. 5.3.13.1-5)**

SECURITY HANDLING FOR RRC RESUME FROM INACTIVE STATE

RELATED APPLICATIONS

This application is a continuation of U.S. patent application Ser. No. 16/721,410, filed Dec. 19, 2019, which is a continuation of U.S. patent application Ser. No. 16/386,077, filed Apr. 16, 2019, which claims the benefit of U.S. Provisional App. No. 62/657,967, filed Apr. 16, 2018, the disclosures of which are incorporated by reference herein in their entirety.

TECHNICAL FIELD

The present invention relates generally to wireless communication networks and in particular to systems and method for maintaining synchronization between a wireless device and a network when the wireless device resumes from an inactive state.

BACKGROUND

Wireless communication networks, enabling voice and data communications to wireless devices, are ubiquitous in many parts of the world, and continue to advance in technological sophistication, system capacity, data rates, bandwidth, supported services, and the like. A basic model of one type of wireless network, generally known as "cellular," features a plurality of generally fixed network nodes (known variously as base station, radio base station, base transceiver station, serving node, NodeB, eNodeB, eNB, gNB, and the like), each providing wireless communication service to a large plurality of wireless devices (known variously as mobile terminals, User Equipment or UE, and the like) within a generally fixed geographical area, known as a cell or sector.

Wireless communications propagate between network nodes, such as a base station and a UE, as information modulated onto radio frequency (RF) carrier signals, which are transmitted by one node across an air interface, and received and demodulated by the other node. Because the medium is necessarily open (as opposed to a copper wire or optical fiber, which can be physically secured), security is a primary concern, and security features are designed into the technical specifications that govern network operation. For example, most user plane signals (those carrying user data, such as voice, video, text, images, and the like) are encrypted. Many control plane signals (those related to technical operation of the network, often referred to as "overhead") are integrity protected, meaning that the contents are not encrypted; however, cryptographic means ensure the receiving node can unambiguously authenticate the identity of the transmitting node. Both encryption and integrity protection are cryptographic operations which rely on the generation and use of various "keys," or unique data that are known (or derivable) only by legitimate parties to the communication. Cryptographic operations only work if the different parties use the same, or compatible, keys.

Radio Resource Control States in LTE and NR

Radio Resource Control (RRC) is an air interface protocol used in the 3$^{rd}$ generation (3G) mobile cellular wireless network protocol Universal Mobile Telecommunications System (UMTS), as well as the 4$^{th}$ generation (4G) protocol, Long Term Evolution (LTE). Modifications to RRC are proposed for the 5$^{th}$ generation (5G) protocol, New Radio (NR). The Third Generation Partnership Project (3GPP) specifications for UMTS RRC are in Technical Standard (TS) 25.331, and for LTE are in TS 36.331.

In LTE, two general RRC modes are defined for a wireless device, or User Equipment (UE): RRC_IDLE and RRC_CONNECTED. Within the RRC_CONNECTED mode, a UE transitions between further RRC states, each having lower power consumption, based on inactivity timers. The RRC_CONNECTED mode states for LTE are CELL-DCH (Dedicated Channel), CELL_FACH (Forward Access Channel), CELL_PCH (Cell Paging Channel) and URA_PCH (UTRAN Registration Area, or URA, Paging Channel). This disclosure focuses on transitions between RRC_CONNECTED and RRC_IDLE modes (and analogous NR RRC transitions), not the RRC_CONNECTED states. Accordingly, as used herein, the terms RRC mode and RRC state are used interchangeably.

In LTE RRC_IDLE state, a UE is known to the core network (CN or EPC), and has an Internet Protocol (IP) address, but is not known/tracked by the Radio Access Network (E-UTRAN/eNB). The UE can receive broadcast/multicast data (e.g., System Information, or SI); monitors a paging channel to detect incoming calls; may perform neighbor cell measurements; and can do cell (re)selection. A UE in RRC_IDLE may be configured by the network for Discontinuous Reception (DRX).

In the LTE RRC_CONNECTED state, the UE is known by the RAN (E-UTRAN/eNB), as well as the core network, and the mobility of the UE is managed by the network. The UE monitors control channels for downlink data, sends channel quality feedback, and may request uplink resources. The RRC messages RRCRelease and RRCConnect transition the UE from RRC_CONNECTED to and from RRC_INACTIVE states.

In LTE Rel-13 a mechanism was introduced for the UE to be suspended by the network in a suspended state similar to RRC_IDLE but with the difference that the UE stores the Access Stratum (AS) context or RRC context. This makes it possible to reduce the signaling when the UE again becomes active by resuming the RRC connection, instead of (as prior) to establish the RRC connection from scratch. Reducing the signaling could have several benefits. First, it would reduce latency, e.g., for smart phones accessing the Internet. Second, the reduced signaling would reduce battery consumption, which is particularly important for machine type devices sending very little data.

The basis of the Rel-13 solution is that the UE sends an RRCConnectionResumeRequest message to the network, and in response receives an RRCConnectionResume from the network. The RRCConnectionResume is not encrypted but is integrity protected.

As part of the standardized work on 5G NR in 3GPP, it has been decided that NR should support an RRC_INACTIVE state with similar properties as the suspended state in LTE Rel-13. The RRC_INACTIVE has slightly different properties from the LTE Rel-13 suspended state, in that it is a separate RRC state and not part of RRC_IDLE, as in LTE. Additionally, the CN/RAN connection (NG or N2 interface) is kept for RRC_INACTIVE while it was suspended in LTE. FIG. 1 depicts the possible RRC state transitions in NR.

The NR RRC states have the following properties:

RRC_IDLE:
A UE specific DRX may be configured by upper layers;
UE controlled mobility based on network configuration;
The UE:
  Monitors a Paging channel for CN paging using 5G-S-TMSI;
  Performs neighbouring cell measurements and cell (re-)selection;
  Acquires system information.

RRC_INACTIVE:
A UE specific DRX may be configured by upper layers or by RRC layer;
UE controlled mobility based on network configuration;
The UE stores the AS context;
The UE:
  Monitors a Paging channel for CN paging using 5G-S-TMSI and RAN paging using I-RNTI;
  Performs neighbouring cell measurements and cell (re-)selection;
  Performs RAN-based notification area updates periodically and when moving outside the RAN-based notification area;
  Acquires system information.

RRC_CONNECTED:
The UE stores the AS context.
Transfer of unicast data to/from UE.
At lower layers, the UE may be configured with a UE specific DRX.;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e. handover within NR and to/from E-UTRAN.
The UE:
  Monitors a Paging channel;
  Monitors control channels associated with the shared data channel to determine if data is scheduled for it;
  Provides channel quality and feedback information;
  Performs neighbouring cell measurements and measurement reporting;
  Acquires system information.

RRC Resume Procedure in NR and Comparison with LTE

One important aspect of RRC_INACTIVE is the security framework, which differs from the solution in LTE.

In LTE, the UE is suspended and, when attempting to resume, it first computes an integrity security token (called short MAC-I) based on an old security key, and then the UE includes that token in the RRC Resume Request. Upon receiving that request, the network fetches the UE context and sends to the UE an integrity-protected RRC Connection Resume Request which contains a next Hop Chaining Count (NCC) parameter that enables the UE to refresh its security keys and start both integrity protection and encryption.

In NR, differently from LTE, instead of refreshing the keys upon the reception of the RRC Resume message and starting security after that, the NR UE in RRC_INACTIVE receives the NCC in the Suspend message that initiates the RRC_INACTIVE state, so that it can refresh the keys even before sending the RRC Resume Request. In NR, it has been agreed that the token—equivalent to the short MAC-I in LTE—is computed based on the newly refreshed keys. Then, the network can fetch the context and send an RRC Resume message that is not only integrity protected, but also encrypted, due to the fact that the UE has already refreshed the keys and initiated security. The agreements related to this procedure were taken on RAN2 #101i in Athens, and are reproduced below:

Working Assumption:
1. NCC provided when the connection is suspended.
2. New key is derived based on the NCC received in the suspend message and used for the calculation of MAC-I in MSG3

Agreements:
1. Msg3 is protected and verification is performed by the last serving gNB before UE context is transferred to another network node.
FFS: Whether it may also be possible that the target gNB can verify the Msg3 in some cases.
  (include in previous offline whether Msg3 is protected with old key or new)
2. Msg3 includes a MAC-I in the RRC message as in LTE.
FFS: Inputs used for MAC-I calculation in order to possibly address the replay attack concern from SA3.

Below is an excerpt from a draft of 3GPP Technical Standard (TS) 38.331, regarding the Resume procedure in NR RRC, which contains these new security aspects:

5.3.13 RRC connection resume
5.3.13.1 General
[FIGS. 5.3.13.1-1 through 5.3.13.1-5 from this specification are reproduced as drawing FIGS. 2-6]
The purpose of this procedure is to resume an RRC connection including resuming SRB(s) and DRB(s) or perform an RNA update.
5.3.13.2 Initiation
The UE initiates the procedure when upper layers request resume of an RRC connection, when responding to NG-RAN paging or upon triggering RNA updates while the UE is in RRC_INACTIVE.
Upon initiation of the procedure, the UE shall:
  Editor's Note: FFS Whether SCG configuration should be released or whether that should be treated as any other configuration (i.e. with delta signalling).
  1> apply the default physical channel configuration as specified in 9.2.4;
  1> apply the default semi-persistent scheduling configuration as specified in 9.2.3;
  1> apply the default MAC main configuration as specified in 9.2.2;
  1> apply the CCCH configuration as specified in 9.1.1.2;
  Editor's Note: FFS Whether NR supports a timeAlignmentTimerCommon, whether is transmitted in SIB2 and UE behavior associated).
  1> start timer T300X;
  1> stop timer T380;
  1> initiate transmission of the RRCResumeRequest message in accordance with 5.3.13.2;
  Editor's Note: FFS Requirements on up to date system information acquisiton before connection resumption.
5.3.13.3 Actions related to transmission of RRCResumeRequest message
The UE shall set the contents of RRCResumeRequest message as follows:
  1> set the resumeIdentity to the stored I-RNTI value provided in suspend;
  1> set the resumeCause in accordance with the information received from upper layers or from AS layer;
  Editor's Note: FFS Whether more aspects related to resumeCause is needed to be captured (e.g. RNA update due to mobility, RNA periodic update, etc.).

1> restore the RRC configuration and security context from the stored UE AS context:
1> update the $K_{gNB}$ key based on the current $K_{gNB}$ or the NH, using the stored nextHopChainingCount value, as specified in TS 33.501 [11];
Editor's Note: FFS How to handle the case of Reject
1> derive the $K_{RRCenc}$ key, the $K_{RRCint}$, the $K_{UPint}$ key and the $K_{UPenc}$ key;
Editor's Note: FFS Working assumption TBC (NCC in suspend and new key in RRC Resume Request).
1> set the resumeMAC-I to the X least significant bits of the MAC-I calculated:
2> over the ASN.1 encoded as per section 8 (i.e., a multiple of 8 bits) VarResumeMAC-Input;
2> with the $K_{RRCint}$ key and the previously configured integrity protection algorithm; and
2> with all input bits for COUNT, BEARER and DIRECTION set to binary ones;
Editor's Note: FFS Length X of the resumeMAC-I.
Editor's Note: FFS Additional input to VarResumeMAC-Input (replay attacks mitigation).
1> restore the PDCP state and re-establish PDCP entities for SRB1;
1> resume SRB1;
1> submit the RRCResumeRequest message to lower layers for transmission;
1> configure lower layers to resume integrity protection for all radio bearers except SRB0 using the previously configured algorithm and the $K_{RRCint}$ key and $K_{UPint}$ key immediately, i.e., integrity protection shall be applied to all subsequent messages received and sent by the UE;
NOTE 1: Only DRBs with previously configured UP integrity protection shall resume integrity protection.
1> configure lower layers to resume ciphering for all radio bearers except SRB0 and to apply the previously configured ciphering algorithm, the $K_{RRCenc}$ key and the $K_{UPenc}$ key, i.e. the ciphering configuration shall be applied to all subsequent messages received and sent by the UE;
If lower layers indicate an integrity check failure while T300X is running, perform actions specified in 5.3.13.5.
The UE shall continue cell re-selection related measurements as well as cell re-selection evaluation. If the conditions for cell re-selection are fulfilled, the UE shall perform cell re-selection as specified in 5.3.13.6.

Agreements on Reject Procedure in NR

The Reject procedure has also been discussed for NR. In RAN2#99bis. The following has been agreed:
A UE in INACTIVE, trying to resume an RRC connection, can receive MSG4 sent over SRB0 (without Integrity protection) to move the UE back into INACTIVE (i.e. rejected with wait timer).
INACTIVE related parameters/configuration should not be updated by a MSG4 sent over SRB0 (as it is a non-protected message).
FIG. 7 depicts the corresponding signal flow for an RRC_INACTIVE to RRC_INACTIVE transition (rejection scenario)

Current Implementation of Agreements on Reject Procedure to RRC NR Specifications As in LTE, timer T302 is started upon the reception of an RRCReject message, which can either be in response to an RRCResumeRequest or RRCSetupRequest, as the following excerpt of 3GPP TS 38.331 shows:
5.3.3.x Reception of the RRCReject by the UE
The UE shall:
1> stop timer T300;
1> reset MAC and release the MAC configuration;
1> start timer T302, with the timer value set to the waitTime;
1> inform upper layers about the failure to establish the RRC connection and access control related information, upon which the procedure ends;
Editor's Note: FFS Which access control related information is informed to higher layers.

Other Reasons why Resume Procedure May not Succeed in NR

There are other cases in which the Resume procedure would fail in NR. These include if the timer, which was started when the UE initiated the Resume Procedure, times out; or if the UE receives a packet which fails to pass the integrity check. The current draft specification for these cases is shown below.
5.3.13.5 T300X expiry or Integrity check failure from lower layers while T300X is running
The UE shall:
1> if timer T300X expires or upon receiving Integrity check failure indication 2>
perform the actions upon going to RRC_IDLE as specified in 5.3.11 with release cause RRC Resume failure;
Editor's Note: It is FFS if T300X is the same as T300.
5.3.13.y Reception of the RRCReject by the UE
The UE shall:
1> stop timer T300X;
1> reset MAC and release the MAC configuration;
1> start timer T302, with the timer value set to the waitTime;
Editor's Note: FFS Whether RRCReject may include redirection information and/or frequency/RAT deprioritisation information.
1> if RRCReject is sent in response to an RRCResumeRequest triggered by upper layers;
2> inform upper layers about the failure to resume the RRC connection and access control related information, upon which the procedure ends;
Editor's Note: FFS UE actions if RRCResumeRequest is not triggered by upper layers.
Editor's Note: FFS Additional UE actions upon receiving RRCReject, e.g. T380 handling, SRB1 suspension, etc.
Editor's Note: FFS Which access control related information is informed to higher layers.
Consideration of the specifications above reveal that the RRC resume procedure in NR can fail for various reasons. Two such cases are apparent from the draft specifications above. First, the network rejects the Resume Request message. This message is sent on SRB0 without security and includes a wait time. The UE will not re-initiate any resume until the wait time has expired. Second, the UE receives at least a packet on SRB1 which does not pass integrity verification. In this case, the UE will consider that the Resume procedure failed, and report an error to higher layers.
In addition to these two cases, if the UE performs cell-reselection when a timer (T300X) is running, it will also consider that the resume procedure failed, and will either inform upper layers or re-try the resume procedure in the target cell.

A problem with all of these cases is that it is not clear how the UE security context should be handled in case the UE resumes again, after a resume failure. Currently, it is stated that the UE derives a new security context in NR (e.g., new keys) prior to sending the Resume Request message. However, if this principle is followed, this would mean that the UE would yet again derive a new security context when it sends the Resume Request again. A problem with that is that the network, e.g., in case of T300X expiration or cell reselection, may not know the UE has derived a new security context twice, since it is not certain that the network received the first Resume Request and/or successfully fetched the UE context. Also, in the case that the network sent a Reject message, the UE may perform a subsequent Resume in a different cell/network node, and that network node may not know that the UE has previously been rejected—and that it therefore derived the security context multiple times.

The result of the currently specified UE behavior is that the network (security) context and the UE (security) context may not be synchronized. In this case, the subsequent Resume procedure will most likely fail since the network will not accept the message from the UE, because it is protected with a security token based on a different security context that with which the network is operating.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention disclosed and claimed herein, a mechanism is introduced the UE to revert back to an old security context if the Resume procedure fails. In this way, any subsequent Resume attempts by the UE will derive new security keys from the old keys, which means that the keys and security context will be the same for each attempt. In this way, the security context in the UE will remain synchronized with the network security context, regardless of how many attempts the UE has performed (assuming the network does not change the security context when the Resume procedure fails). Alternatively, the UE may store the new security context it derives during the first Resume attempt, and then ensure that it is reused at subsequent Resume attempts.

One embodiment relates to a method of a updating a security context. The method is performed by a wireless device operative in a wireless communication network employing a Radio Resource Control (RRC) protocol. The wireless device in RRC CONNECTED state receives from the network an RRC Suspend message including a security update parameter. In response to the RRC Suspend message, the wireless device enters an RRC INACTIVE state and stores a first security context. Upon attempting to transition to an RRC CONNECTED state, a second security context is generated using the security update parameter received in the RRC Suspend message. An RRC Resume Request message, including a security parameter from the second security context, is sent to the network. Only if any of the following events occur, the second security context is discarded and the first security context is retrieved: an RRC Reject message is received from the network in response to the RRC Resume Request message; a timer started upon sending the RRC Resume Request message expires without receiving a responsive message from the network; or a cell reselection is performed prior to receiving a message from the network responsive to the RRC Resume Request message.

Another embodiment relates to a method of updating a security context. The method is performed by a wireless device operative in a wireless communication network employing a Radio Resource Control (RRC) protocol. The wireless device in RRC CONNECTED state receives from the network an RRC Suspend message including a security update parameter. In response to the RRC Suspend message, the wireless device enters an RRC INACTIVE state and stores a first security context. Upon attempting to transition to an RRC CONNECTED state. A second security context is generated from the security update parameter received in the RRC Suspend message. An RRC Resume Request message, including a security parameter from the second security context, is sent to the network. Either immediately in one embodiment, or in another embodiment in response to any of the following events, the second security context is stored and utilized it until confirmed by the network: an RRC Reject message is received from the network in response to the RRC Resume Request message; a timer started upon sending the RRC Resume Request message expires without receiving a responsive message from the network; or a cell reselection is performed prior to receiving a message from the network responsive to the RRC Resume Request message.

Yet another embodiment relates to a method of a updating a security context for a wireless device. The method is performed by a base station operative in a wireless communication network employing a Radio Resource Control (RRC) protocol. A previously active security context for the wireless device is stored. An RRC Resume Request message including a security token is received from the wireless device. A temporary security context for the wireless device is generated. The temporary security context is used to verify the security token. An RRC message is sent to the wireless device. If no response to the RRC message is received from the wireless device, the temporary security context is discarded and the previously active security context is retrieved. In one embodiment, if a response to the RRC message is received from the wireless device, the temporary security context is made the active security context for the wireless device.

Still another embodiment relates to a wireless device operative in a wireless communication network employing an RRC protocol, wherein the wireless device in RRC CONNECTED state receives from the network an RRC Suspend message including a security update parameter, and in response to the RRC Suspend message enters an RRC INACTIVE state and stores a first security context. The wireless device includes communication circuitry and processing circuitry operatively connected to the communication circuitry. The processing circuitry is adapted to, upon attempting to transition to an RRC CONNECTED state, generate a second security context using the security update parameter received in the RRC Suspend message; send to the network an RRC Resume Request message including a security parameter from the second security context; and in response to one of the following events, discard the second security context and retrieve the first security context: receiving from the network an RRC Reject message in response to the RRC Resume Request message; expiration of a timer started upon sending the RRC Resume Request message, without receiving a responsive message from the network; or performing a cell reselection prior to receiving a message from the network responsive to the RRC Resume Request message.

Still another embodiment relates to a wireless device operative in a wireless communication network employing an RRC protocol. The wireless device in RRC CONNECTED state receives from the network an RRC Suspend message including a security update parameter, and in response to the RRC Suspend message enters an RRC INACTIVE state and stores a first security context. The wireless device includes communication circuitry and processing circuitry operatively connected to the communication circuitry. The processing circuitry is adapted to, upon attempting to transition to an RRC CONNECTED state: generate a second security context from the security update parameter received in the RRC Suspend message; send to the network an RRC Resume Request message including a security parameter from the second security context; and immediately or in response to one of the following events, store the second security context and utilize it until confirmed by the network. The events include receiving from the network an RRC Reject message in response to the RRC Resume Request message; expiration of a timer started upon sending the RRC Resume Request message, without receiving a responsive message from the network; or performing a cell reselection prior to receiving a message from the network responsive to the RRC Resume Request message.

Still another embodiment relates to a base station operative in a wireless communication network employing an RRC protocol. The base station includes communication circuitry and processing circuitry operatively connected to the communication circuitry. The processing circuitry is adapted to: store a previously active security context for the wireless device; receive from the wireless device an RRC Resume Request message including a security token; generate a temporary security context for the wireless device; use the temporary security context to verify the security token; send an RRC message to the wireless device; and if no response to the RRC message is received from the wireless device, discard the temporary security context and retrieve the previously active security context.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
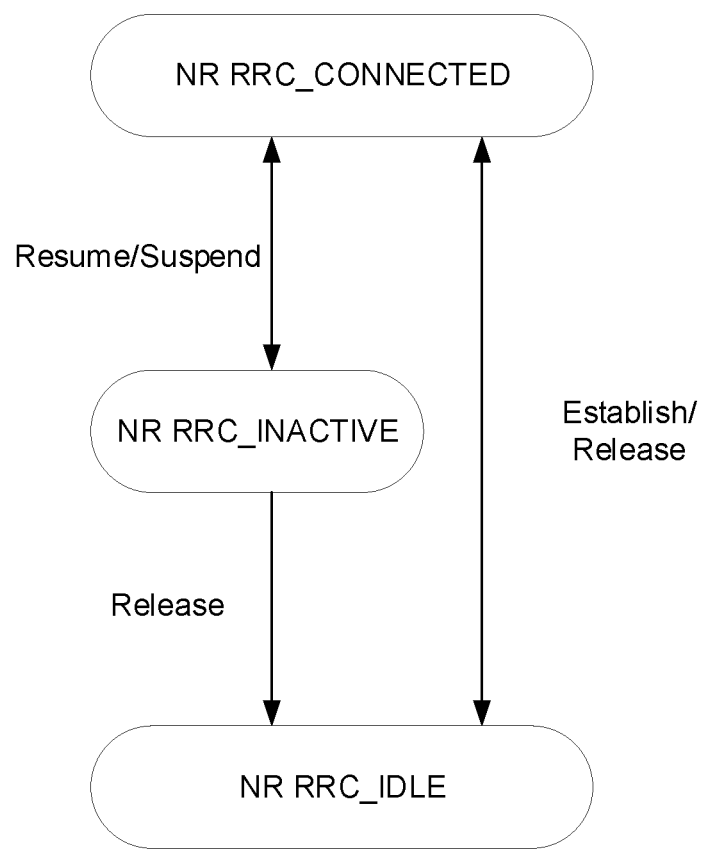
FIG. 1 is a state diagram of RRC states in NR.
Figure 2:
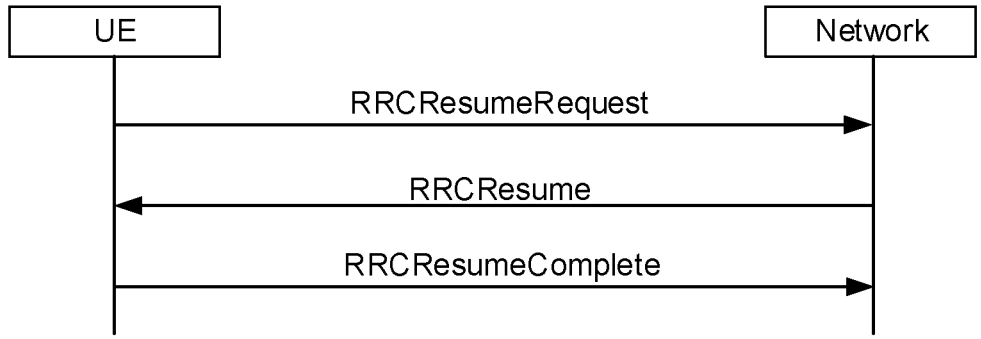
FIG. 2 is a signal diagram of an RRC successful connection resumption (3GPP TS 38.331 FIG. 5.3.13.1-1).
Figure 3:
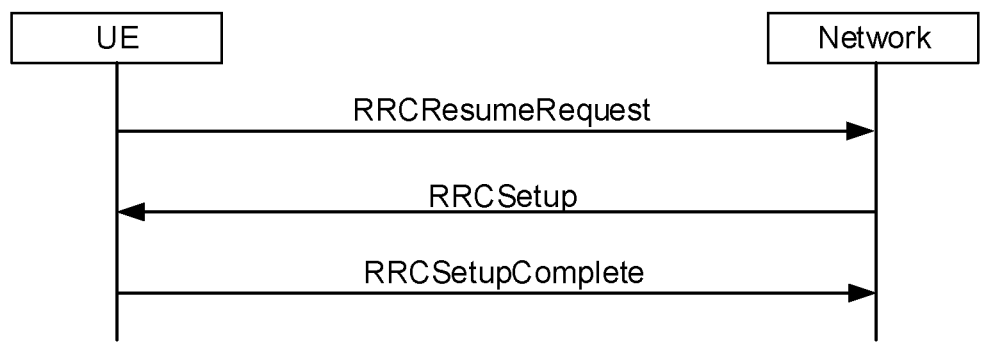
FIG. 3 is a signal diagram of an RRC successful connection resumption via a connection establishment (FIG. 5.3.13.1-2).
Figure 4:
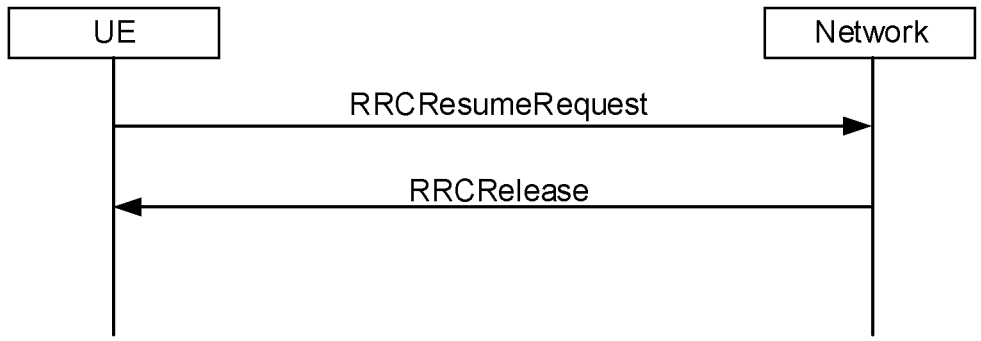
FIG. 4 is a signal diagram of an RRC successful connection resumption followed by a network release (FIG. 5.3.13.1-3).
Figure 5:
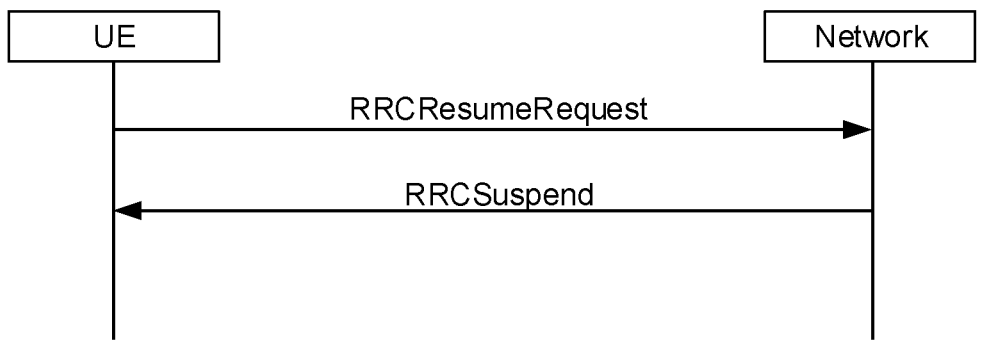
FIG. 5 is a signal diagram of an RRC successful connection resumption followed by a network release (FIG. 5.3.13.1-4).
Figure 6:
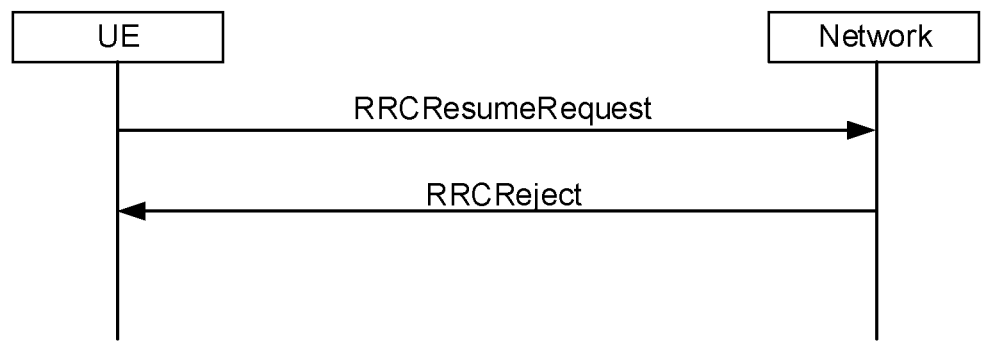
FIG. 6 is a signal diagram of a rejected RRC connection resumption (FIG. 5.3.13.1-5).
Figure 7:
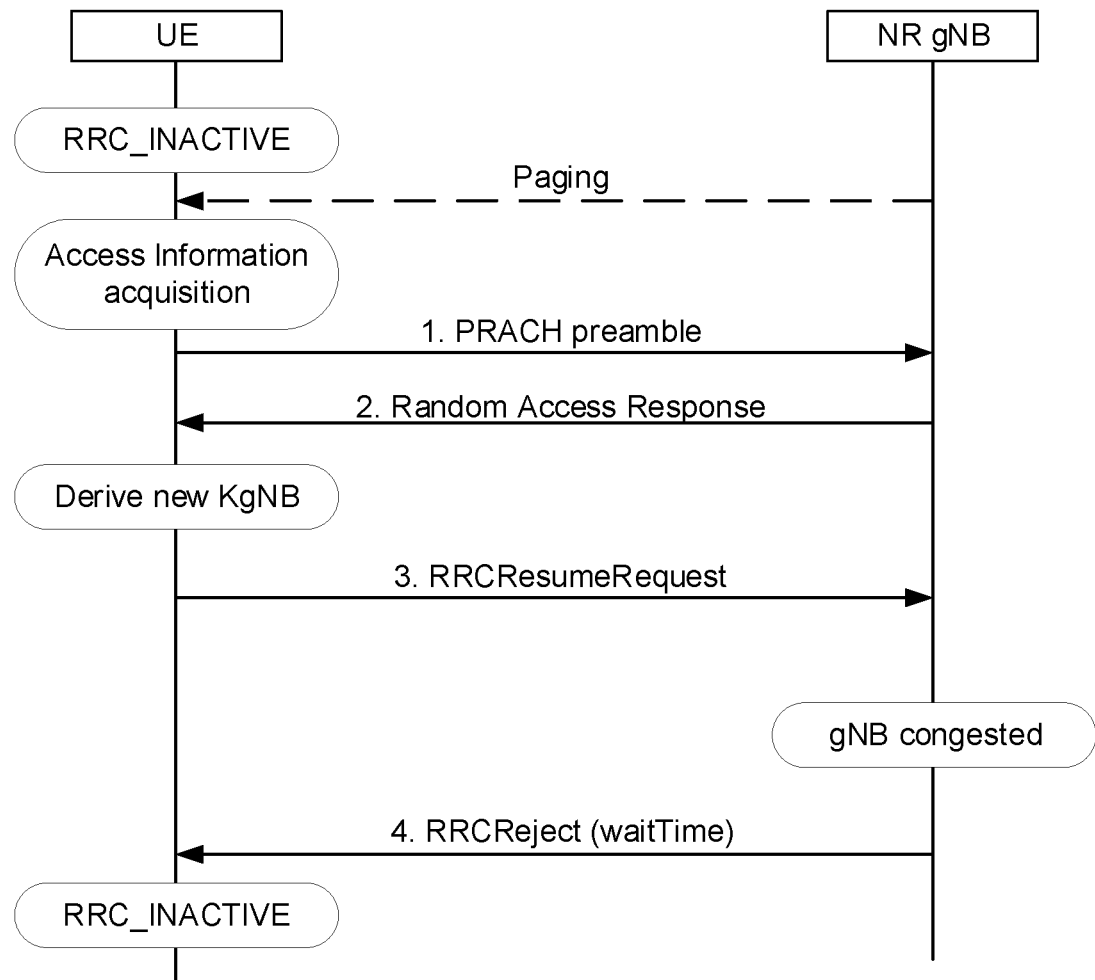
FIG. 7 is a signal diagram of transition from and to RRC_INACTIVE, via RRCReject.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Embodiments where UE Discards New Security Context

According to one embodiment of the present invention, a UE reverts to its prior security context upon a failed Resume procedure. When the UE generates a new security context including new keys ($K_{gNB}$, $S\text{-}K_{gNB}$, $K_{RRCenc}$, $K_{RRCint}$, $K_{UPint}$, $K_{UPenc}$, etc.) or applies new parameters (including reset counters) such as NCC, COUNT, etc., it will consider the new context and parameters as temporary, meaning it will store old values of the parameters. The UE discards the new security context and restores the stored security context and parameters in the following three cases.

First, the UE restores a prior security context and parameters when it receives an RRCReject message (or equivalent) in response to the UE resuming a connection (i.e., sending an RRCResumeRequest message). The RRCReject message could contain a wait time, to which the UE sets a timer, e.g., T302 (although of course any name may be used to denote the timer). The UE may also obtain the wait time from other sources, e.g., it may use a pre-defined default value defined in the technical standards, or it may receive the wait time in another message, such as a broadcast message.

Second, assuming the UE started a timer, e.g., T300X (although of course any name may be used to denote the timer) when initiating a Resume procedure, then when the timer expires, the UE restores a prior (stored) security context and parameters.

Third, the UE restores a prior security context and parameters when it performs a cell reselection after requesting a connection (i.e., sending an RRCResumeRequest message), but prior to receiving a Resume message. Note that if a timer, e.g., T300X (although of course any name may be used to denote the timer) was started when initiating the Resume procedure, the UE would revert to a prior security context and parameters upon the cell reselection and while the timer (e.g., T300X) is running.

In any of these cases, when the UE performs a subsequent resume procedure (i.e., sending an RRCResumeRequest message), e.g., due to the Resume request being rejected, a relevant timer expires (e.g., T300X or T380), or it entered another cell, the UE restores the prior, stored security context and parameters, and uses the restored security context to derive a new security context (e.g., keys).

When the UE receives an RRC Resume or RRC Suspend or RRC Release message which is integrity protected by PDCP layer using the new security context, the UE considers the new security context valid (i.e., no longer a temporary context), and discards the stored old security context and parameters.

When the UE receives an RRC Setup message, which triggers the UE to discard its stored AS context, the UE also discards any stored security context (both old and new temporary).

Embodiments where UE Discards New Security Context

According to another embodiment of the present invention, a UE stores a new security context upon a failed Resume procedure, and reuses it when again attempting to Resume. The UE generates a new security context including new keys ($K_{gNB}$, $S\text{-}K_{gNB}$, $K_{RRCenc}$, $K_{RRCint}$, $K_{UPint}$, $K_{UPenc}$, etc.) or applies new parameters (including reset counters) such as NCC, or COUNT. The UE then stores this new security context, for possible use at a later time. The UE stores the new security context (or maintains a stored, new security context) in the following three cases.

First, the UE maintains a new security context and parameters when it receives an RRCReject message (or equivalent) in response to the UE resuming a connection (i.e., sending an RRCResumeRequest message). The RRCReject message could contain a wait time, to which the UE sets a timer, e.g., T380 (although of course any name may be used to denote the timer). The UE may also obtain the wait time from other sources, e.g., it may use a pre-defined default value defined in the technical standards, or it may receive the wait time in another message, such as a broadcast message.

Second, assuming the UE started a timer, e.g., T300X (although of course any name may be used to denote the timer) when initiating a Resume procedure, then when the timer expires, the UE uses the same (stored) new security context and parameters.

Third, the UE maintains a new security context and parameters when it performs a cell reselection after requesting a connection (i.e., sending an RRCResumeRequest message), but prior to receiving a Resume message. Note that if a timer, e.g., T300X (although of course any name may be used to denote the timer) was started when initiating the Resume procedure, the UE would use the new (stored) security context and parameters upon the cell reselection and while the timer (e.g., T300X) is running.

In any of these cases, when the UE performs a subsequent resume procedure (i.e., sending an RRCResumeRequest message), e.g., due to the Resume request being rejected, a relevant timer expires (e.g., T300X or T380), or it entered another cell, the UE does not generate a new security context; instead, uses the stored new security context (e.g. keys).

When the UE receives an RRC Resume or RRC Suspend or RRC Release message which is integrity protected by PDCP layer using the new security context, the UE considers the new security context valid.

When the UE receives an RRC Setup message, which triggers the UE to discard its stored AS context, the UE also discards any stored security context.

Network Embodiments

In either of the above embodiments (upon a failed Resume procedure, the UE either discards new security context and restores the old, or stores and maintains the new security context), the network operates cooperatively.

Upon receiving the UE RRC Resume Request message, the network generates a new UE security context (e.g., in the source or target RAN node, or another network node). The new security context (e.g., keys) is used to verify the security token included in the RRCResumeRequest message. It may also be used to encrypt and/or integrity protect the RRCResume message. When doing this, however, the network considers the security context as a temporary context, and stores the old security context. If the network does not receive any response to a subsequent message that the network sends to the UE—e.g., RRC Resume, RRC Suspend, RRC Release—it either discards the new security context and restores the old security context and parameters.

Representative Specification Changes

The following are representative examples of changes to the relevant 3GPP technical specifications that implement embodiments described herein. Changes are marked-up (deletions; additions):

Embodiments where UE Discards New Security Context 5.3.13.3 Actions related to transmission of RRCResumeRequest message The UE shall set the contents of RRCResumeRequest message as follows:

1> set the resumeIdentity to the stored I-RNTI value provided in suspend;

1> set the resumeCause in accordance with the information received from upper layers or from AS layer;

Editor's Note: FFS Whether more aspects related to resumeCause is needed to be captured (e.g. RNA update due to mobility, RNA periodic update, etc.).

1> restore the RRC configuration and security context from the stored UE AS context:

1> generate a temporary $K_{gNB}$ key based on the current $K_{gNB}$ or the NH, using the stored nextHopChainingCount value, as specified in TS 33.501 [11];
  Editor's Note: FFS How to handle the case of Reject
  1> derive the temporary $K_{RRCenc}$ key, the temporary $K_{RRCint}$, the temporary $K_{UPint}$ key and the temporary $K_{UPenc}$ key;
  Editor's Note: FFS Working assumption TBC (NCC in suspend and new key in RRC Resume Request).
  1> set the resumeMAC-I to the X least significant bits of the MAC-I calculated:
    2> over the ASN.1 encoded as per section 8 (i.e., a multiple of 8 bits) VarResumeMAC-Input;
    2> with the temporary $K_{RRCint}$ key and the previously configured integrity protection algorithm; and
    2> with all input bits for COUNT, BEARER and DIRECTION set to binary ones;
  Editor's Note: FFS Length X of the resumeMAC-I.
  Editor's Note: FFS Additional input to VarResumeMAC-Input (replay attacks mitigation).
  1> restore the PDCP state and re-establish PDCP entities for SRB1;
  1> resume SRB1;
  1> submit the RRCResumeRequest message to lower layers for transmission;
  1> configure lower layers to resume integrity protection for all radio bearers except SRB0 using the previously configured algorithm and the temporary $K_{RRCint}$ key and temporary $K_{UPint}$ key immediately, i.e., integrity protection shall be applied to all subsequent messages received and sent by the UE;
    NOTE 1: Only DRBs with previously configured UP integrity protection shall resume integrity protection.
  1> configure lower layers to resume ciphering for all radio bearers except SRB0 and to apply the previously configured ciphering algorithm, the temporary $K_{RRCenc}$ key and the temporary $K_{UPenc}$ key, i.e. the ciphering configuration shall be applied to all subsequent messages received and sent by the UE;
If lower layers indicate an integrity check failure while T300X is running, perform actions specified in 5.3.13.5.
The UE shall continue cell re-selection related measurements as well as cell re-selection evaluation. If the conditions for cell re-selection are fulfilled, the UE shall perform cell re-selection as specified in 5.3.3.5.
5.3.13.5 T300X expiry or Integrity check failure from lower layers while T300X is running or the UE performs cell reselection while T300X is running
The UE shall:
  1> discard the temporary security context including temporary keys $K_{gNB}$, $K_{RRCint}$, $K_{RRCenc}$, $K_{UPint}$ and $K_{UPenc}$
  1> if timer T300X expires or upon receiving Integrity check failure indication
    2> perform the actions upon going to RRC_IDLE as specified in 5.3.11 with release cause RRC Resume failure;
    Editor's Note: It is FFS if T300X is the same as T300.
5.3.13.y Reception of the RRCReject by the UE
The UE shall:
  1> discard the temporary security context including temporary keys $K_{gNB}$, $K_{RRCint}$, $K_{RRCenc}$, $K_{UPint}$ and $K_{UPenc}$
  1> stop timer T300X;
  1> reset MAC and release the MAC configuration;
  1> start timer T302, with the timer value set to the waitTime;
  Editor's Note: FFS Whether RRCReject may include redirection information and/or frequency/RAT deprioritisation information.

1> if RRCReject is sent in response to an RRCResumeRequest triggered by upper layers;
    2> inform upper layers about the failure to resume the RRC connection and
    access control related information, upon which the procedure ends;
  Editor's Note: FFS UE actions if RRCResumeRequest is not triggered by upper layers.
  Editor's Note: FFS Additional UE actions upon receiving RRCReject e.g. T380 handling, SRB1 suspension, etc.
  Editor's Note: FFS Which access control related information is informed to higher layers.
Embodiments where UE Retains the New Security Context and Discards the Old
5.3.13.3 Actions related to transmission of RRCResumeRequest message
The UE shall set the contents of RRCResumeRequest message as follows:
  1> set the resumeIdentity to the stored I-RNTI value provided in suspend;
  1> set the resumeCause in accordance with the information received from upper layers or from AS layer;
  Editor's Note: FFS Whether more aspects related to resumeCause is needed to be captured (e.g. RNA update due to mobility, RNA periodic update, etc.).
  1> restore the RRC configuration:
  1> if the UE has no stored "resume security context"
    2> restore the security context from the stored UE AS context
    2> update the $K_{gNB}$ key based on the current $K_{gNB}$ or the NH, using the stored nextHopChainingCount value, as specified in TS 33.501 [11];
  Editor's Note: FFS How to handle the case of Reject
    2> derive the $K_{RRCenc}$ key, the $K_{RRCint}$, the $K_{UPint}$ key and the $K_{UPenc}$ key;
  Editor's Note: FFS Working assumption TBC (NCC in suspend and new key in RRC Resume Request).
  1> else
    2> set the $K_{gNB}$, the $K_{RRCenc}$ key, the $K_{RRCint}$, the $K_{UPint}$ key and the $K_{UPenc}$ key to the values in the stored "resume security context"
  1> (alternative 1) store the keys $K_{gNB}$, $K_{RRCint}$, $K_{RRCenc}$, $K_{UPint}$ and $K_{UPenc}$ in the "resume security context"
  1> set the resumeMAC-I to the X least significant bits of the MAC-I calculated:
    2> over the ASN.1 encoded as per section 8 (i.e., a multiple of 8 bits) VarResumeMAC-Input;
    2> with the temporary $K_{RRCint}$ key and the previously configured integrity protection algorithm; and
    2> with all input bits for COUNT, BEARER and DIRECTION set to binary ones;
  Editor's Note: FFS Length X of the resumeMAC-I.
  Editor's Note: FFS Additional input to VarResumeMAC-Input (replay attacks mitigation).
  1> restore the PDCP state and re-establish PDCP entities for SRB1;
  1> resume SRB1;
  1> submit the RRCResumeRequest message to lower layers for transmission;
  1> configure lower layers to resume integrity protection for all radio bearers except SRB0 using the previously configured algorithm and the $K_{RRCint}$ key and $K_{UPint}$ key immediately, i.e., integrity protection shall be applied to all subsequent messages received and sent by the UE;
    NOTE 1: Only DRBs with previously configured UP integrity protection shall resume integrity protection.

1> configure lower layers to resume ciphering for all radio bearers except SRB0 and to apply the previously configured ciphering algorithm, the $K_{RRcenc}$ key and the $K_{UPenc}$ key, i.e. the ciphering configuration shall be applied to all subsequent messages received and sent by the UE; If lower layers indicate an integrity check failure while T300X is running, perform actions specified in 5.3.13.5.

The UE shall continue cell re-selection related measurements as well as cell re-selection evaluation. If the conditions for cell re-selection are fulfilled, the UE shall perform cell re-selection as specified in 5.3.3.5.

5.3.13.5 T300X expiry or Integrity check failure from lower layers while T300X is running or the UE performs cell reselection while T300X is running The UE shall:
    1> (alternative 2) store the keys $K_{gNB}$, $K_{RRCint}$, $K_{RRCenc}$, $K_{UPint}$ and $K_{UPenc}$ in the "resume security context"
    1> if timer T300X expires or upon receiving Integrity check failure indication
        2> perform the actions upon going to RRC_IDLE as specified in 5.3.11 with release cause RRC Resume failure;
    Editor's Note: It is FFS if T300X is the same as T300.

5.3.13.y Reception of the RRCReject by the UE

The UE shall:
    1> (alternative 2) store the keys $K_{gNB}$, $K_{RRCint}$, $K_{RRCenc}$, $K_{UPint}$ and $K_{UPenc}$ in the "resume security context"
    1> stop timer T300X;
    1> reset MAC and release the MAC configuration;
    1> start timer T302, with the timer value set to the waitTime;
    Editor's Note: FFS Whether RRCReject may include redirection information and/or frequency/RAT deprioritisation information.
    1> if RRCReject is sent in response to an RRCResumeRequest triggered by upper layers;
        2> inform upper layers about the failure to resume the RRC connection and access control related information, upon which the procedure ends;
    Editor's Note: FFS UE actions if RRCResumeRequest is not triggered by upper layers.
    Editor's Note: FFS Additional UE actions upon receiving RRCReject e.g. T380 handling, SRB1 suspension, etc.
    Editor's Note: FFS Which access control related information is informed to higher layers.

Methods

Figure 8:
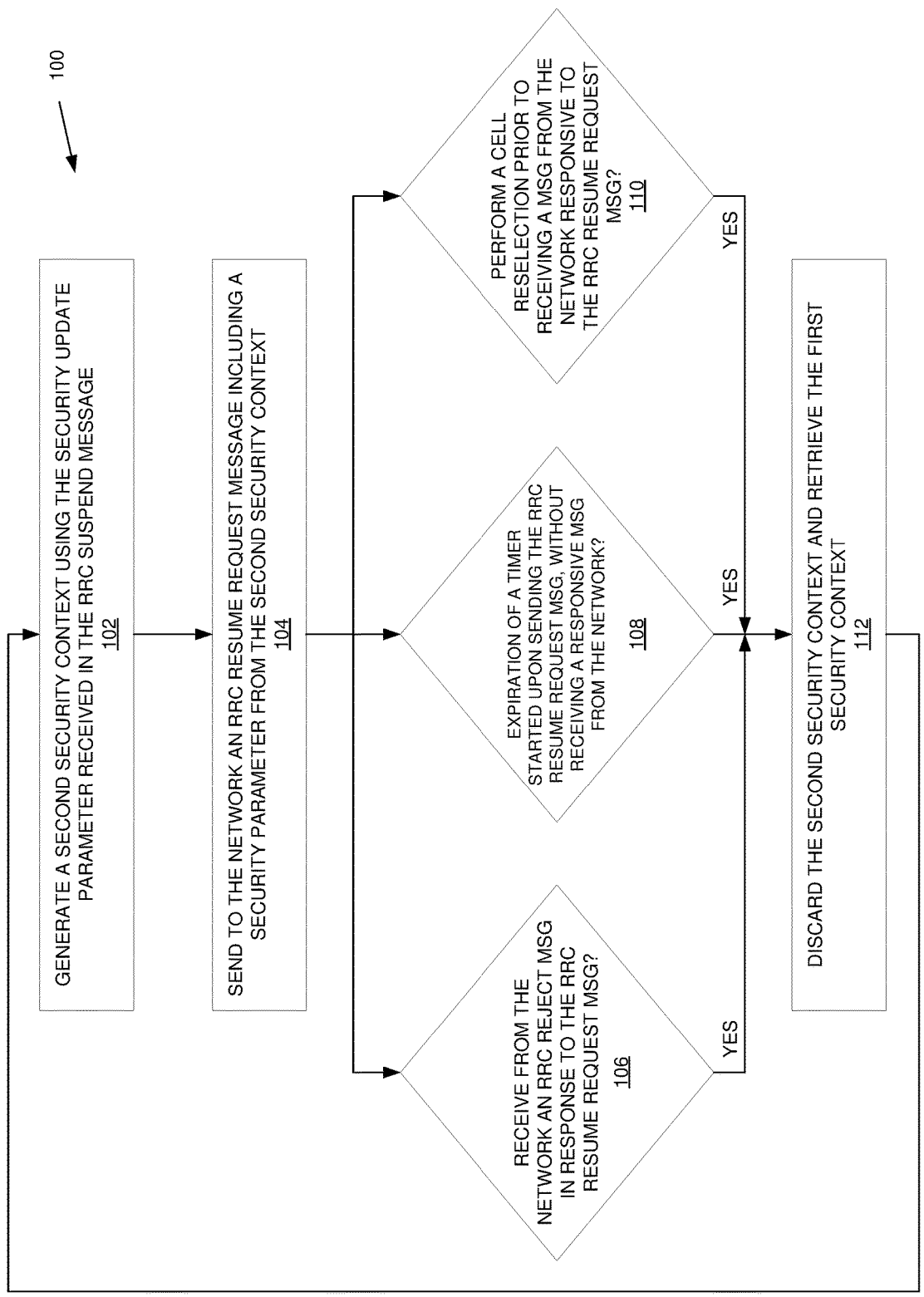
FIG. 8 is a flow diagram of one method of updating a security context by a wireless device.

FIG. 8 depicts a method 100 of a updating a security context in accordance with particular embodiments. The method is performed by a wireless device operative in a wireless communication network employing a Radio Resource Control (RRC) protocol. The wireless device in RRC CONNECTED state receives from the network an RRC Suspend message including a security update parameter. In response to the RRC Suspend message, the wireless device enters an RRC INACTIVE state and stores a first security context. Upon attempting to transition to an RRC CONNECTED state, a second security context is generated using the security update parameter received in the RRC Suspend message (block 102). An RRC Resume Request message, including a security parameter from the second security context, is sent to the network (block 104). Only if any of the following events occur, does the method 100 proceed to block 112: an RRC Reject message is received from the network in response to the RRC Resume Request message (block 106); a timer started upon sending the RRC Resume Request message expires without receiving a responsive message from the network (block 108); or a cell reselection is performed prior to receiving a message from the network responsive to the RRC Resume Request message (block 110). If the event of any of blocks 106, 108, or 110 occur, then in response, the second security context is discarded and the first security context is retrieved (block 112), and the method 100 is repeated.

Figure 9:
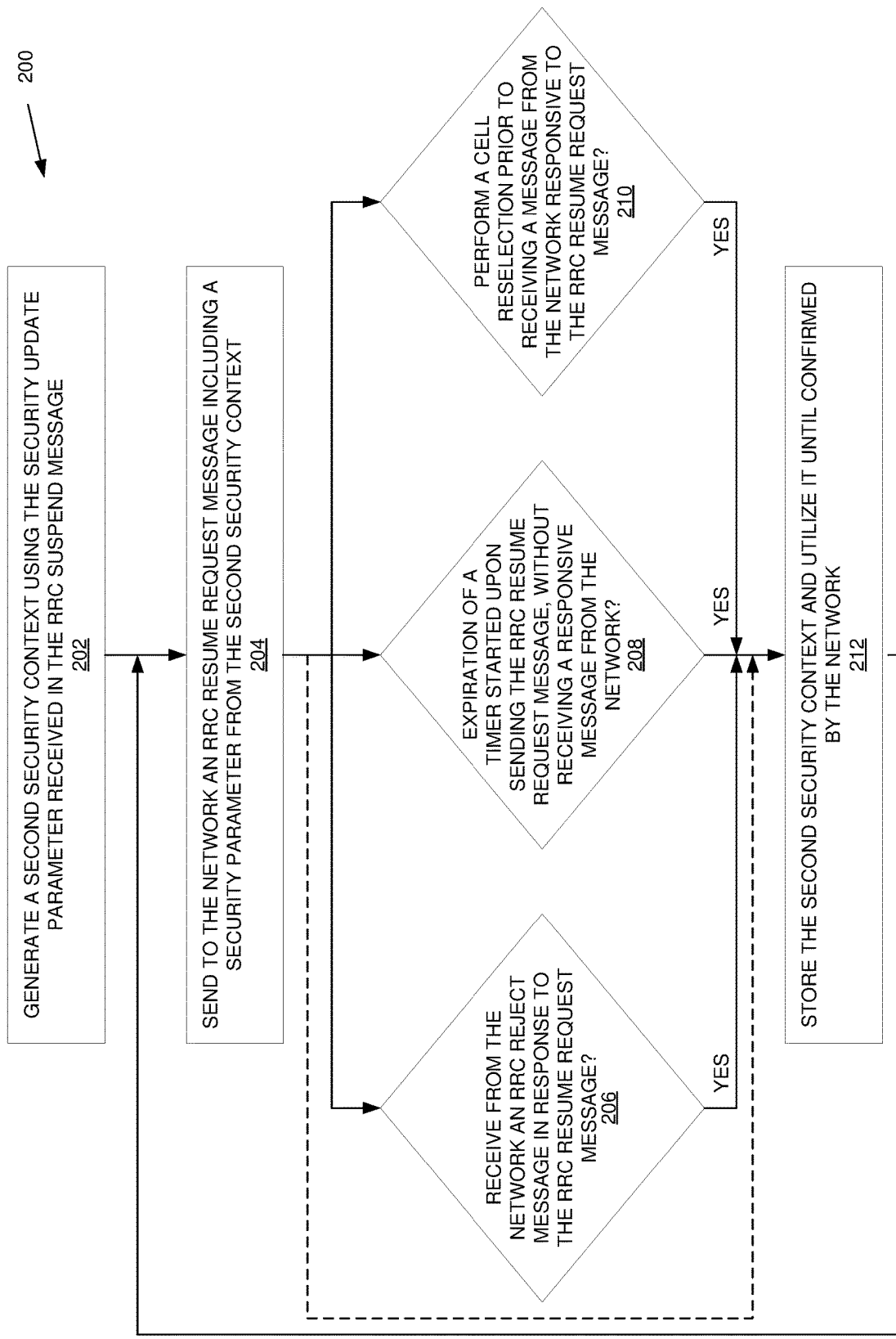
FIG. 9 is a flow diagram of another method of updating a security context by a wireless device.

FIG. 9 depicts a method 200 of a updating a security context in accordance with other particular embodiments. The method is performed by a wireless device operative in a wireless communication network employing a Radio Resource Control (RRC) protocol. The wireless device in RRC CONNECTED state receives from the network an RRC Suspend message including a security update parameter. In response to the RRC Suspend message, the wireless device enters an RRC INACTIVE state and stores a first security context. Upon attempting to transition to an RRC CONNECTED state. A second security context is generated from the security update parameter received in the RRC Suspend message (block 202). An RRC Resume Request message, including a security parameter from the second security context, is sent to the network (block 204). Either immediately in one embodiment (as indicated by dashed lines), or in another embodiment in response to any of the following events, the method 200 proceeds to block 212: an RRC Reject message is received from the network in response to the RRC Resume Request message (block 206); a timer started upon sending the RRC Resume Request message expires without receiving a responsive message from the network (block 208); or a cell reselection is performed prior to receiving a message from the network responsive to the RRC Resume Request message (block 210) Immediately after block 204 in one embodiment (as indicated by dashed lines), or in another embodiment if the events of any of blocks 206, 208, or 210 occur, then in response, the second security context is stored and utilized it until confirmed by the network (block 212), and the method 200 is repeated, except for block 202.

Figure 10:
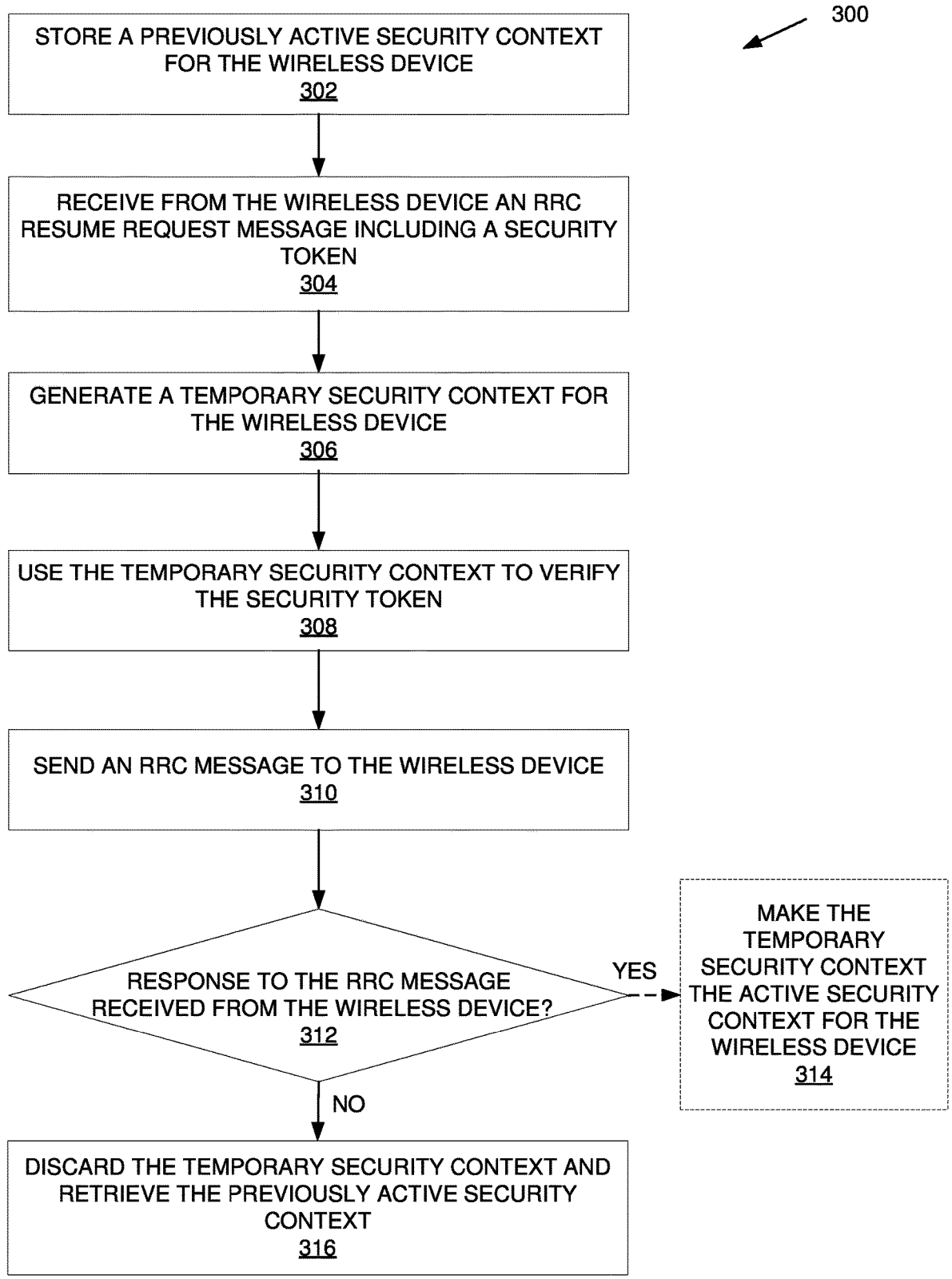
FIG. 10 is a flow diagram of a method of updating a security context for a wireless device by a base station.

FIG. 10 depicts a method 300 of a updating a security context for a wireless device in accordance with particular embodiments. The method is performed by a base station operative in a wireless communication network employing a Radio Resource Control (RRC) protocol. A previously active security context for the wireless device is stored (block 302). An RRC Resume Request message including a security token is received from the wireless device (block 304). A temporary security context for the wireless device is generated (block 306). The temporary security context is used to verify the security token (block 308). An RRC message is sent to the wireless device (block 310). If no response to the RRC message is received from the wireless device (block 312), the temporary security context is discarded and the previously active security context is retrieved (block 314). In one embodiment, if a response to the RRC message is received from the wireless device (block 312), the temporary security context is made the active security context for the wireless device (block 316).

Apparatuses

Apparatuses described herein may perform the methods 100, 200, 300 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 11:
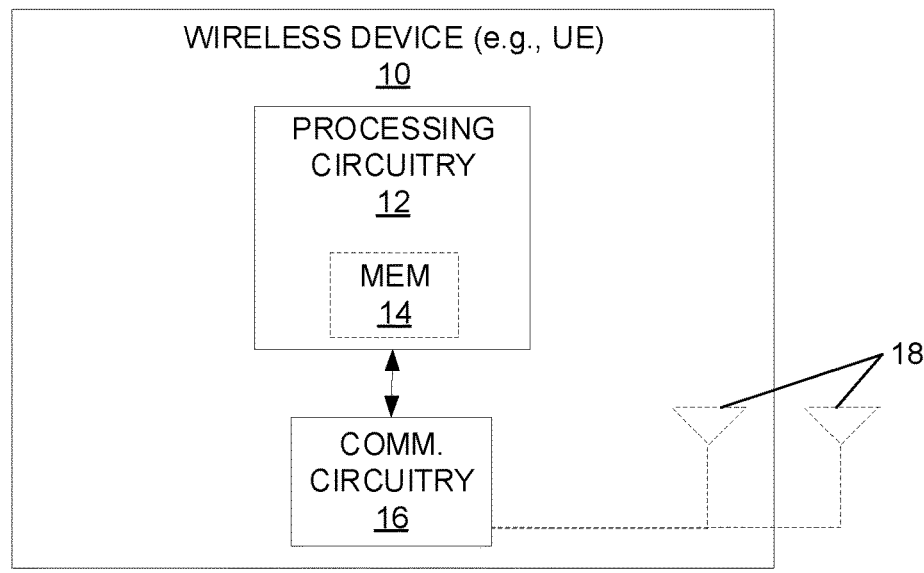
FIG. 11 is a hardware block diagram of a wireless device.

FIG. 11 illustrates a wireless device 10, e.g., in the form of a UE. A UE 10 is any type of device capable of communicating with another radio node, such as a base station or another UE, using radio signals. A UE 10 may therefore refer to a machine-to-machine (M2M) device, a machine-type communications (MTC) device, a Narrow-band Internet of Things (NB IoT) device, etc. The UE 10 may also comprise a cellular telephone or "smartphone," however, the term UE should be understood to encompass any radio node 10, even one that does not have a "user." A UE 10 may also be referred to as a radio device, a radio communication device, a wireless device, a wireless terminal, or simply a terminal—unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), V2X UE, ProSe UE, PDA, iPAD, Tablet, etc. In the discussion herein, the terms machine-to-machine (M2M) device, machine-type communication (MTC) device, wireless sensor, and sensor may also be used. It should be understood that these devices, although referred to as UEs 10, may be configured to transmit and/or receive data without direct human interaction.

In some embodiments, the UE 10 includes a user interface, including e.g. a display, touchscreen, keyboard or keypad, microphone, speaker, and the like) (not shown); in other embodiments, such as in many M2M, MTC, or NB IoT scenarios, the UE 10 may include only a minimal, or no, user interface. The UE 10 also includes processing circuitry 12; memory 14; and communication circuitry 16, including, e.g., a RF transceiver, connected to one or more antennas 18, to effect wireless communication across an air interface to one or more other radio nodes, such as a base station, access points, and/or other UEs. As indicated by the dashed lines, the antenna(s) 18 may protrude externally from the UE 10, or the antenna(s) 18 may be internal. In some embodiments, a UE 10 may additionally include features such as a camera, accelerometer, satellite navigation signal receiver circuitry, vibrating motor, and the like (not depicted in FIG. 11).

According to embodiments of the present invention, the memory 14 is operative to store, and the processing circuitry 12 is operative to execute, software which when executed is operative to cause the UE 10 to update a security context upon exiting an RRC_INACTIVE state. In particular, the software, when executed on the processing circuitry 12, is operative to perform the methods 100 and/or 200 described and claimed herein. The processing circuitry 12 in this regard may implement certain functional means, units, or modules.

Figure 12:
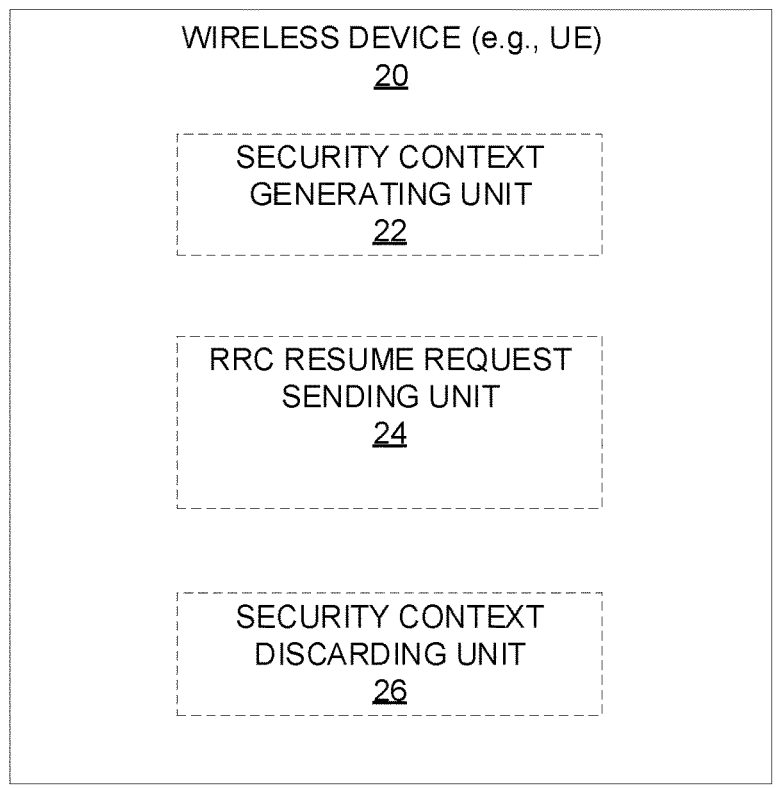
FIG. 12 is a functional block diagram of a wireless device according to one embodiment.
Figure 16:
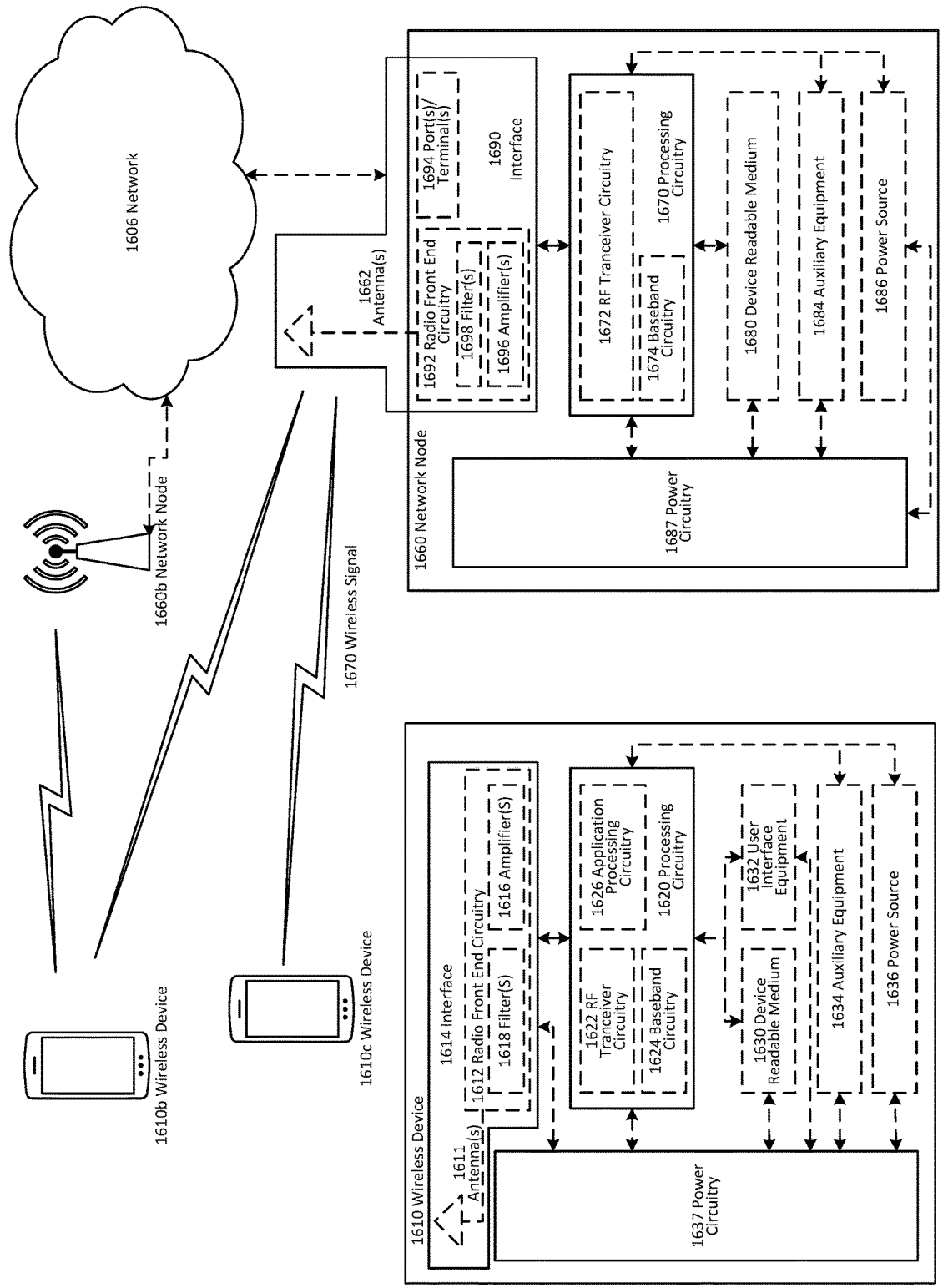
FIG. 16 is a block diagram of a network and some network components.

FIG. 12 illustrates a functional block diagram of a wireless device 20 in a wireless network according to still other embodiments (for example, the wireless network shown in FIG. 16). As shown, the wireless device 20 implements various functional means, units, or modules, e.g., via the processing circuitry 12 in FIG. 11 and/or via software code. These functional means, units, or modules, e.g., for implementing the method 100 herein, include for instance: security context generating unit 22, RRC Resume Request sending unit 24, and security context discarding unit 26. Security context generating unit 22 is configured to generate a second security context using a security update parameter received in the RRC Suspend message. RRC Resume Request sending unit 24 is configured to send to the network an RRC Resume Request message including a security parameter from the second security context. Security context discarding unit 26 is configured to, if the wireless device 20 is not transitioned to RRC CONNECTED state, discard the second security context and retrieve a first security context stored in response to receiving an RRC Suspend message and entering an RRC INACTIVE state. The wireless device 20 may not transition to RRC CONNECTED state, for example, for any of the following events occurring: receiving from the network an RRC Reject message in response to the RRC Resume Request message; expiration of a timer started upon sending the RRC Resume Request message, without receiving a responsive message from the network; or performing a cell reselection prior to receiving a message from the network responsive to the RRC Resume Request message.

Figure 13:
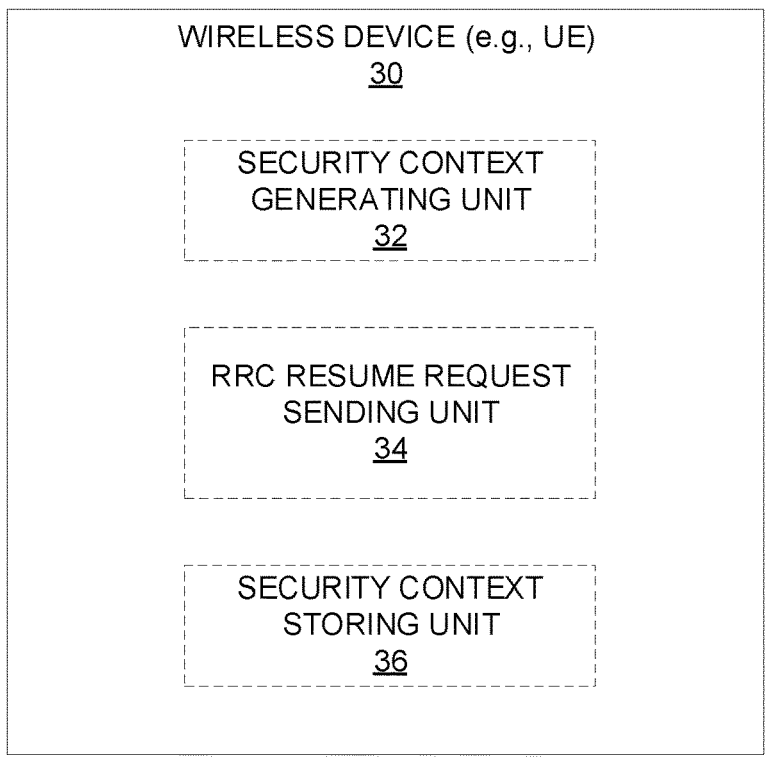
FIG. 13 is a functional block diagram of a wireless device according to another embodiment.

FIG. 13 illustrates a functional block diagram of a wireless device 30 in a wireless network according to still other embodiments (for example, the wireless network shown in FIG. 16). As shown, the wireless device 30 implements various functional means, units, or modules, e.g., via the processing circuitry 12 in FIG. 11 and/or via software code. These functional means, units, or modules, e.g., for implementing the method 200 herein, include for instance: security context generating unit 32, RRC Resume Request sending unit 34, and security context storing unit 36. Security context generating unit 32 is configured to generate a second security context using a security update parameter received in the RRC Suspend message. RRC Resume Request sending unit 34 is configured to send to the network an RRC Resume Request message including a security parameter from the second security context. Security context storing unit 36 is configured to, immediately in one embodiment, and in another embodiment if the wireless device 30 is not transitioned to RRC CONNECTED state, store the second security context and utilize it until confirmed by the network. The wireless device 30 may not transition to RRC CONNECTED state, for example, for any of the following events occurring: receiving from the network an RRC Reject message in response to the RRC Resume Request message; expiration of a timer started upon sending the RRC Resume Request message, without receiving a responsive message from the network; or performing a cell reselection prior to receiving a message from the network responsive to the RRC Resume Request message.

Figure 14:
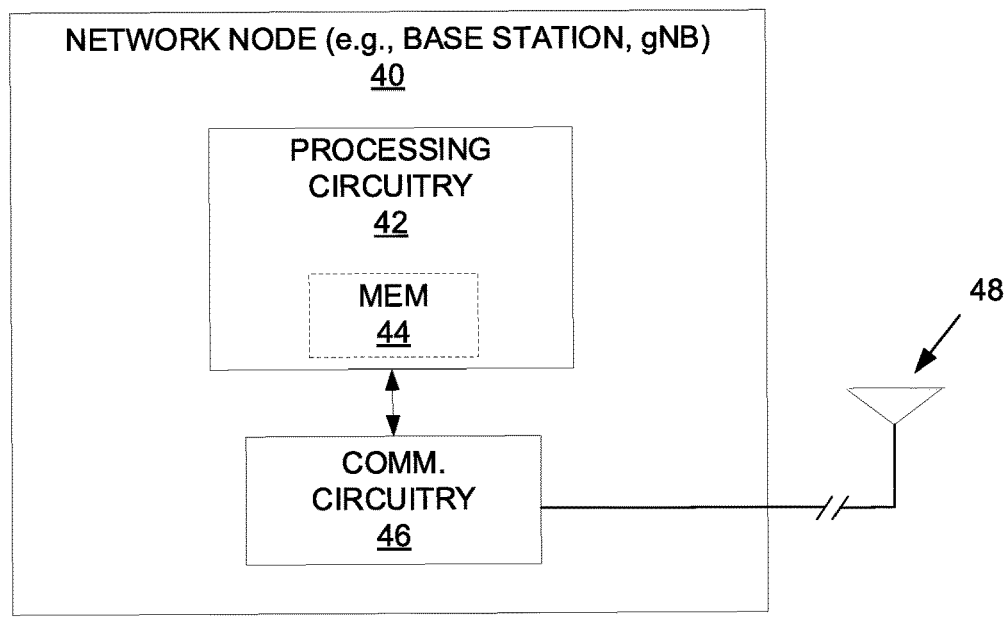
FIG. 14 is a hardware block diagram of a base station.

FIG. 14 illustrates a network node 40 as implemented in accordance with one or more embodiments. As shown, the network node 40 includes processing circuitry 42 and communication circuitry 46. The communication circuitry 46 is configured to transmit and/or receive information to and/or from one or more other nodes, e.g., via any communication technology. The processing circuitry 42 is configured to perform processing described above, such as by executing instructions stored in memory 44. The processing circuitry 42 in this regard may implement certain functional means, units, or modules.

FIG. 14 illustrates a network node 40 in the form of a serving node of one or more UEs 10, known in the art as a base station, NodeB, NB, eNB, gNB, Radio Base Station, Base Transceiver Station, Access Point, or the like. The base station 40 includes processing circuitry 42; memory 44; and communication circuitry 46, including e.g. a RF transceiver, connected to one or more antennas 48, to effect wireless communication across an air interface to one or more UEs 10. As indicated by the broken connection to the antenna(s) 48, the antenna(s) 48 may be physically located separately from the base station 40, such as mounted on a tower, building, or the like. Although the memory 44 is depicted as being internal to the processing circuitry 42, those of skill in the art understand that the memory 44 may also be external. Those of skill in the art additionally understand that virtualization techniques allow some functions nominally executed by the processing circuitry 42 to actually be executed by other hardware, perhaps remotely located (e.g., in the so-called "cloud").

According to embodiments of the present invention, the processing circuitry 42 is operative to cause the base station 40 to updating a security context for a wireless device 10. In particular, the processing circuitry 42 is operative to perform the method 300 described and claimed herein. The processing circuitry 42 in this regard may implement certain functional means, units, or modules.

Figure 15:
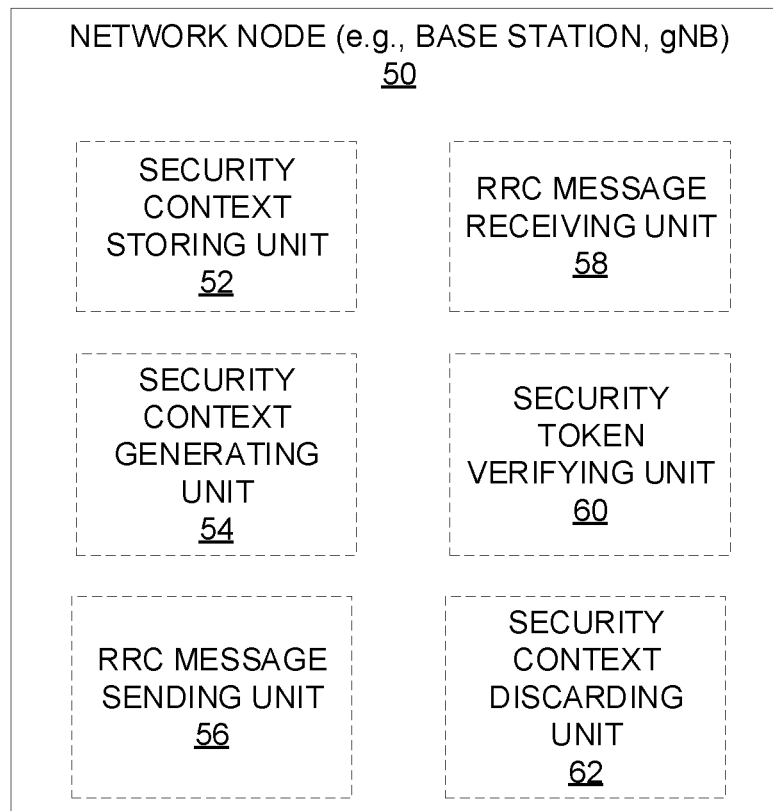
FIG. 15 is a functional block diagram of a base station.

FIG. 15 illustrates a functional block diagram of a base station 50 in a wireless network according to still other embodiments (for example, the wireless network shown in FIG. 16). As shown, the network node 50 implements various functional means, units, or modules, e.g., via the processing circuitry 42 in FIG. 14 and/or via software code. These functional means, units, or modules, e.g., for implementing the method 300 herein, include for instance: security context storing unit 52, RRC message receiving unit 54, security context generating unit 56, security token verifying unit 58, RRC message sending unit 60, and security context discarding unit 62. Security context storing unit 52 is configured to store a previously active security context for the wireless device. RRC message receiving unit 54 is configured to receive from the wireless device an RRC Resume Request message including a security token. Security context generating unit 56 is configured to generate a temporary security context for the wireless device. Security token verifying unit 58 is configured to use the temporary security context to verify the security token. RRC message sending unit 60 is configured to send an RRC message to the wireless device. Security context discarding unit 62 is configured to, if the RRC message receiving unit 54 indicates that no response to the RRC message is received from the wireless device, discard the temporary security context and retrieve the previously active security context.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Advantages of Embodiments of the Present Invention

Embodiments of the present invention present numerous advantages over the prior art. For example, the network does not need to have mechanism to keep track of how many failed Resume attempts the UE has performed. This is particularly beneficial when the network is overloaded and rejecting UE resume attempts, in that keeping track of attempts would add to the network load (e.g., increase signaling between base stations).

Embodiments of the present invention also reduce the risk that the UE and network context lose synchronization, which could lead to service interruption for end user traffic, or in the worst case that the UE and network get stuck in an unrecoverable state (e.g., UE keeps resuming again and again, all leading to failure).

Embodiments of the present invention have been described herein with reference to the RRC_INACTIVE state of NR. However, these embodiments may be advantageously applied to other contexts, for example, any RRC_INACTIVE state (or functional equivalent) in LTE. Furthermore, embodiments are also applicable to Inter-RAT procedures involving RRC_INACTIVE, such as for example between LTE and NR RATs connected to the same CN (e.g., a 5G Core Network). One such scenario is when a UE in LTE RRC_CONNECTED is suspended to LTE RRC_INACTIVE, then performs mobility and camps on an NR cell (i.e., becomes in NR RRC_INACTIVE). Another is when a UE in NR RRC_CONNECTED is suspended to NR RRC_INACTIVE, then performs mobility and camps on an LTE cell (i.e., transit to LTE RRC_INACTIVE).

Over the Top Embodiments

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components. Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636.

Power circuitry 1637 may perform any formatting, converting, or other modification to the power from power source 1636 to make the power suitable for the respective components of WD 1610 to which power is supplied.

Figure 17:
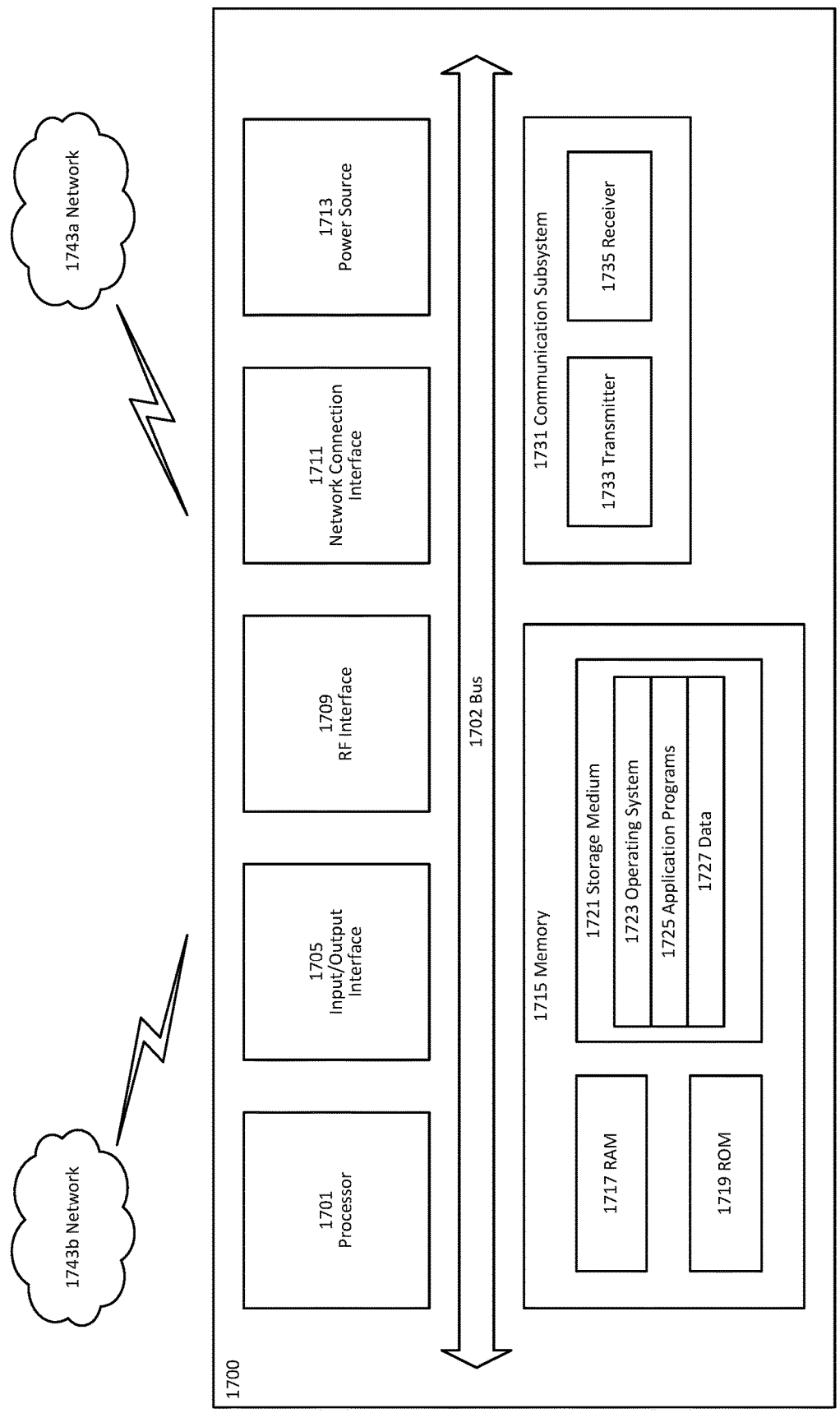
FIG. 17 is a block diagram of a User Equipment.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the 3rd Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743*a*. Network 1743*a* may encompass wired and/or wireless networks such as a local-area network (LAN), a wide-area network (WAN), a computer network, a wireless network, a telecommunications network, another like network or any combination thereof. For example, network 1743*a* may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS)

optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
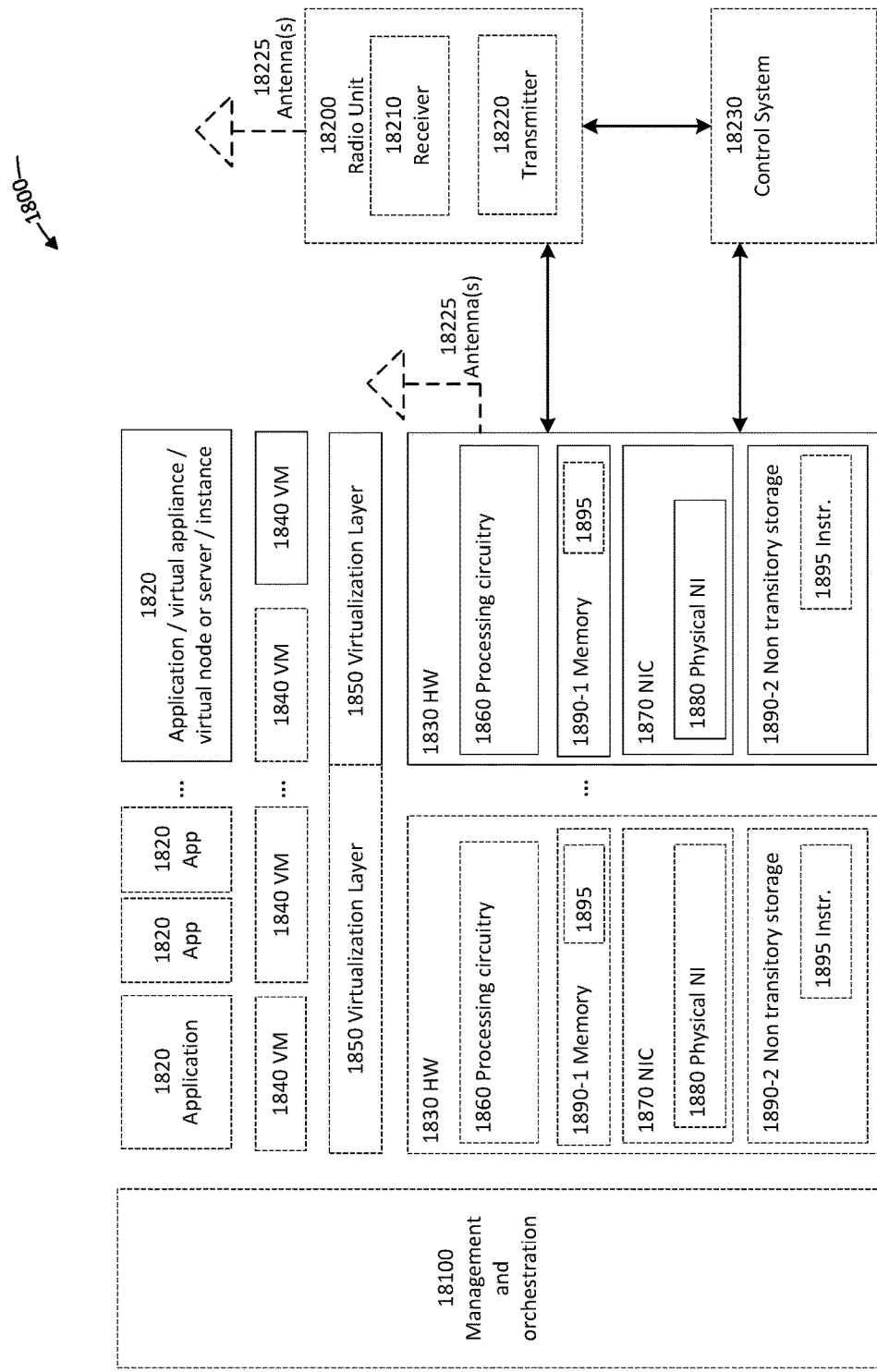
FIG. 18 is a schematic block diagram illustrating a virtualization environment.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
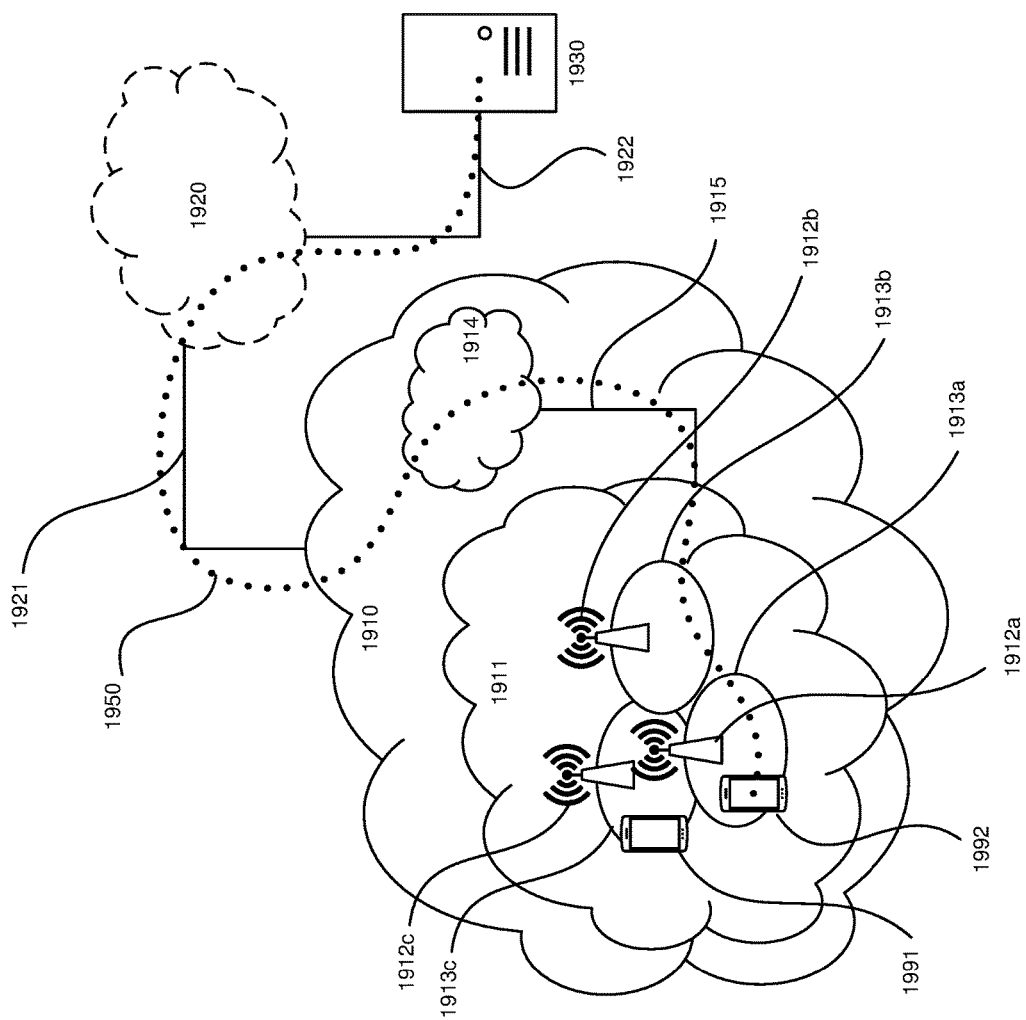
FIG. 19 illustrates a telecommunication network connected via an intermediate network to a host computer.

FIG. 19 illustrates a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
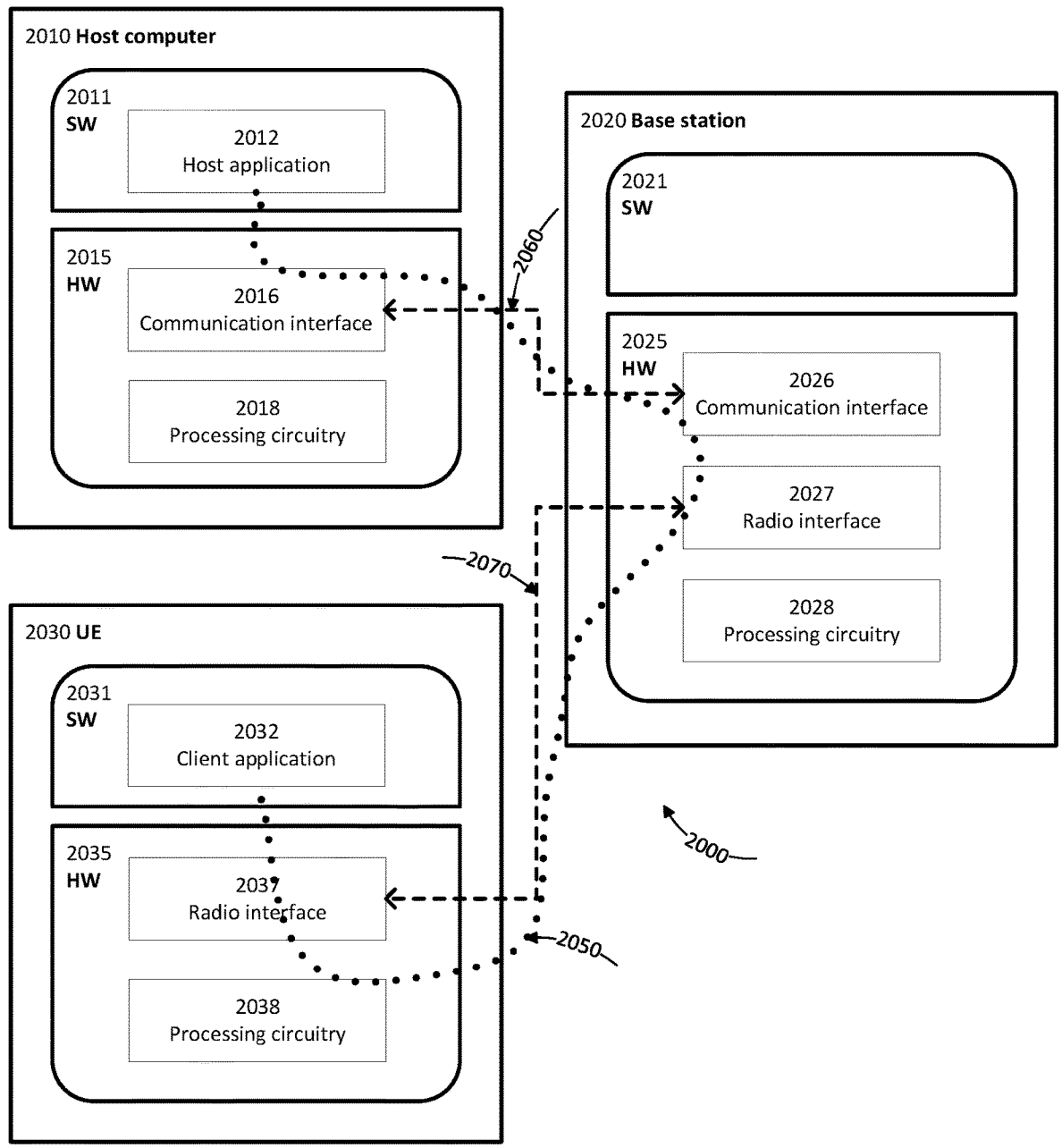
FIG. 20 illustrates host computer communicating via a base station with a user equipment over a partially wireless connection.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912a, 1912b, 1912c and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the synchronization of security states between the network and wireless devices, and thereby provide benefits such as avoiding the signaling required to correct unsynchronized security states, thereby reducing congestion and prolonging device battery life. In some cases, embodiments of the invention may prevent a complete failure of a wireless device to connect to a network.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
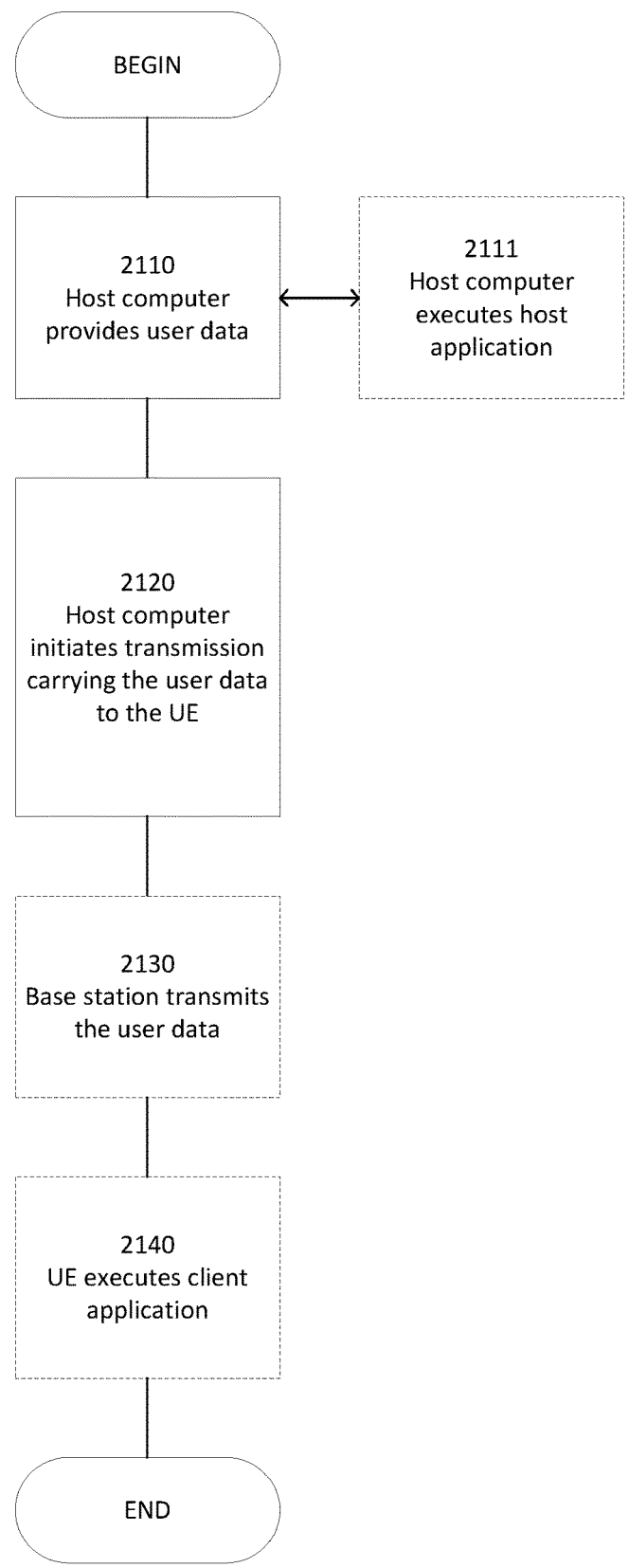
FIG. 21 is a flowchart illustrating a host computer communicating with a UE in a communication system.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
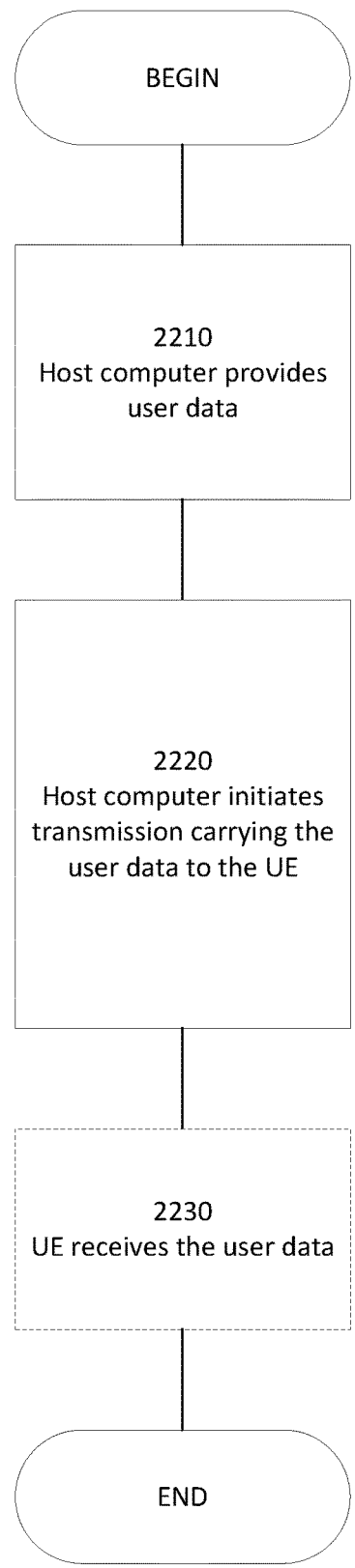
FIG. 22 is a flowchart illustrating a host computer communicating with a UE in a communication system.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
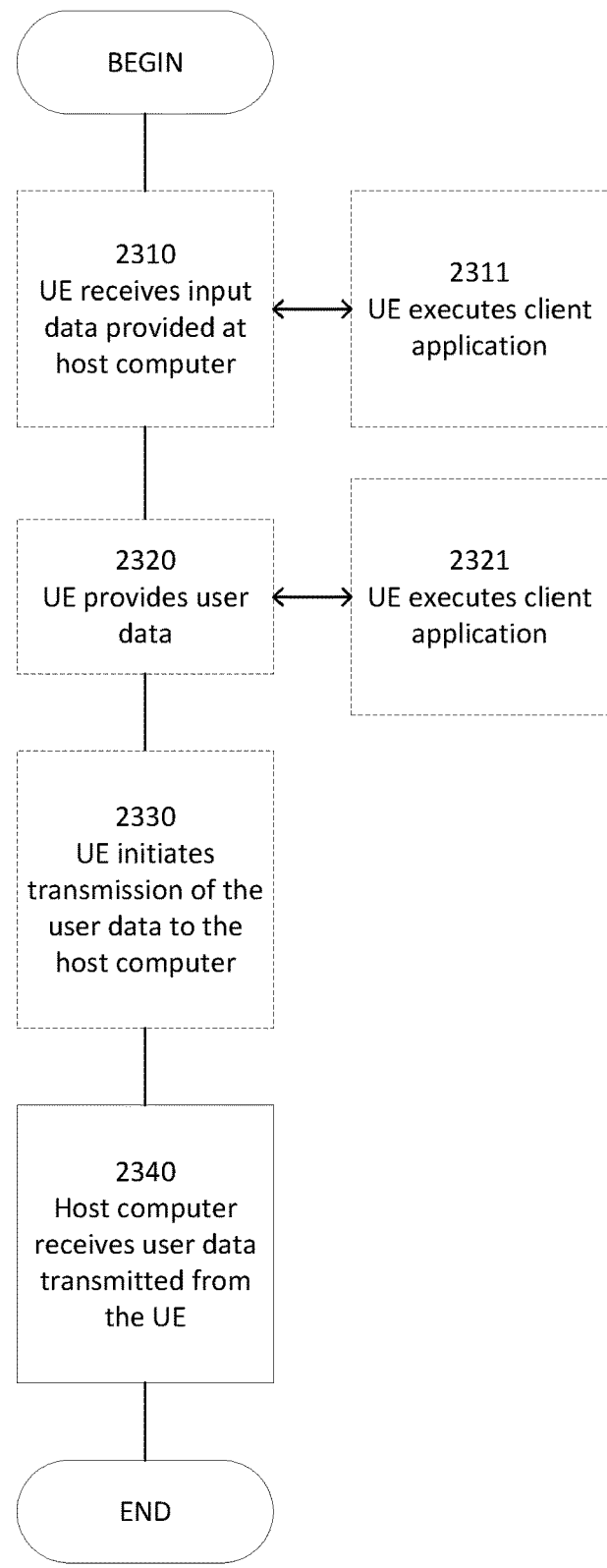
FIG. 23 is a flowchart illustrating a UE communicating with a host computer in a communication system.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
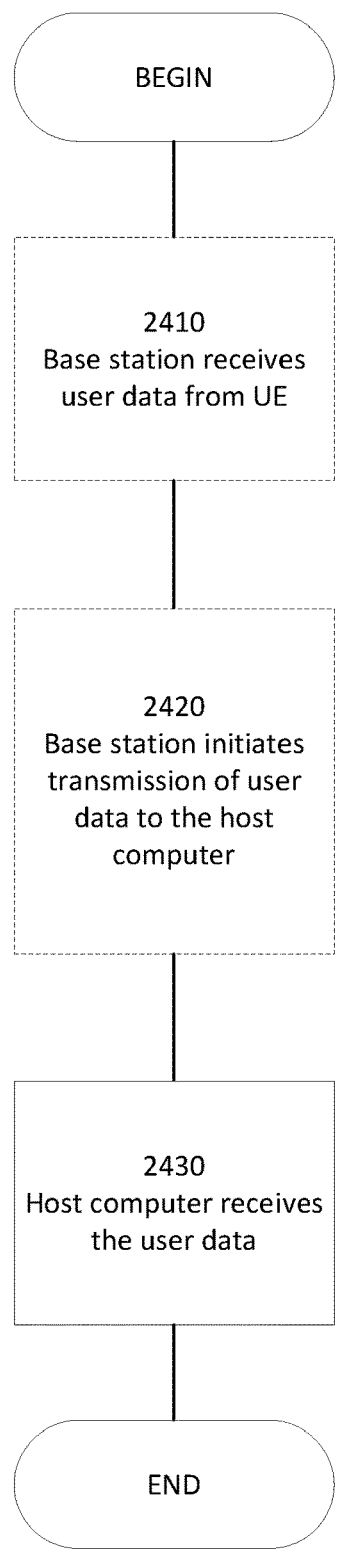
FIG. 24 is a flowchart illustrating communication between a base station and a host computer in a communication system.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A host computer comprising:
   processing circuitry configured to provide user data; and
   a communication interface configured to forward user data to a cellular network, for transmission to a user equipment (UE), the network employing a Radio Resource Control (RRC) protocol, wherein the UE in an RRC CONNECTED state receives from the network an RRC Suspend message including a security update parameter, and in response to the RRC Suspend message enters an RRC INACTIVE state and stores a first security context,
   wherein the UE comprises a radio interface and UE processing circuitry, the UE processing circuitry adapted, upon attempting to transition to the RRC CONNECTED state, to:
      generate a second security context using the security update parameter received in the RRC Suspend message;

send to the network an RRC Resume Request message;
determining whether the UE has received from the network an RRC Reject message in response to the RRC Resume Request message, a timer started upon sending the RRC Resume Request message has expired without the UE receiving a responsive message from the network, or the UE has performed a cell reselection prior to receiving a message from the network responsive to the RRC Resume Request message;
receiving from the network an RRC Reject message in response to the RRC Resume Request message; and
in response to determining that the UE has received the RRC Reject message in response to the RRC Resume Request message, discard the second security context and restoring the first security context,
in response to determining that the timer started upon sending the RRC Resume Request message has expired without the UE receiving a responsive message from the network, discard the second security context, or
in response to determining that the UE has performed a cell reselection prior to receiving a message from the network responsive to the RRC Resume Request message, discard the second security context.

2. The host computer of claim 1, wherein the cellular network further includes a base station configured to communicate with the UE.

3. The host computer of claim 1, wherein:
the processing circuitry of the host computer is configured to execute a host application, thereby providing the user data; and
the UE processing circuitry is configured to execute a client application associated with the host application.

4. A method of a updating a security context for a UE implemented in a communication system including a host computer, a base station employing a Radio Resource Control (RRC) protocol, and a user equipment (UE), the method comprising:
at the host computer, providing user data; and
at the host computer, initiating a transmission carrying the user data to the UE via a cellular network comprising the base station, wherein the base station is operable to:
store a previously active security context for the UE;
receive from the UE an RRC Resume Request message including a security token;
generate a temporary security context for the UE;
use the temporary security context to verify the security token;
send an RRC message to the UE; and
upon determining that no response to the RRC message has been received from the UE, discard the temporary security context and retrieve the previously active security context.

5. The method of claim 4, wherein the user data is provided at the host computer by executing a host application, the method further comprising:
at the UE, executing a client application associated with the host application.

6. The method of claim 4, wherein the UE is in an RRC INACTIVE state.

7. The method of claim 4, wherein generating a temporary security context for the UE comprises generating the temporary security context using a security update parameter sent to the UE in an RRC Suspend message.

8. The method of claim 7, wherein the security update parameter sent to the UE in the RRC Suspend message comprises a chaining counter parameter used for next hop access key derivation.

9. The method of claim 4, wherein the previously active security context and the temporary security context comprise one or more cryptographic keys.

10. The method of claim 4, wherein sending an RRC message to the UE comprises sending an RRC Resume message to the UE.

11. The method of claim 10, wherein the RRC Resume message is integrity protected using the temporary security context.

12. The method of claim 10, wherein the RRC Resume message is encrypted using the temporary security context.

13. The method of claim 4, wherein sending an RRC message to the UE comprises sending an RRC Suspend or RRC Release message to the UE.

14. The method of claim 4, further comprising, if a response to the RRC message is received from the UE:
discard the previously active security context; and
make the temporary security context the active security context for the UE.

15. A host computer comprising:
processing circuitry configured to provide user data; and
a communication interface configured to initiate transmission of the user data to a cellular network for transmission to a user equipment (UE),
wherein the cellular network comprises a base station having a radio interface and base station processing circuitry, the base station processing circuitry configured to:
store a previously active security context for the UE;
receive from the UE an RRC Resume Request message including a security token;
generate a temporary security context for the UE;
use the temporary security context to verify the security token;
send an RRC message to the UE; and
upon determining that no response to the RRC message has been received from the UE, discard the temporary security context and retrieve the previously active security context; and
transmit the user data received from the communication interface of the host computer to the UE.

16. The host computer of claim 15, wherein the user data is provided at the host computer by executing a host application, and wherein the UE executes a client application associated with the host application.

17. The host computer of claim 15, wherein the UE is in an RRC INACTIVE state.

18. The host computer of claim 15, wherein generating a temporary security context for the UE comprises generating the temporary security context using a security update parameter sent to the UE in an RRC Suspend message.

19. The host computer of claim 18, wherein the security update parameter sent to the UE in the RRC Suspend message comprises a chaining counter parameter used for next hop access key derivation.

20. The host computer of claim 15, wherein the previously active security context and the temporary security context comprise one or more cryptographic keys.

21. The host computer of claim 15, wherein sending an RRC message to the UE comprises sending an RRC Resume message to the UE.

22. The host computer of claim 21, wherein the RRC Resume message is integrity protected using the temporary security context.

23. The host computer of claim 21, wherein the RRC Resume message is encrypted using the temporary security context.

24. The host computer of claim 15, wherein sending an RRC message to the UE comprises sending an RRC Suspend or RRC Release message to the UE.

25. The host computer of claim 15, further comprising, upon determining that a response to the RRC message has been received from the UE:
   discard the previously active security context; and
   make the temporary security context the active security context for the UE.

* * * * *

UNITED STATES PATENT AND TRADEMARK OFFICE
CERTIFICATE OF CORRECTION

| | |
|---|---|
| PATENT NO. | : 11,032,715 B2 |
| APPLICATION NO. | : 17/103401 |
| DATED | : June 8, 2021 |
| INVENTOR(S) | : Mildh et al. |

It is certified that error appears in the above-identified patent and that said Letters Patent is hereby corrected as shown below:

In the Specification

In Column 1, Line 9, delete "2019," and insert -- 2019, now Pat. No. 10,555,168, --, therefor.

In Column 3, Line 29, delete "DRX.;" and insert -- DRX. --, therefor.

In Column 3, Line 31, delete "bandwidth;" and insert -- bandwidth. --, therefor.

In Column 3, Line 33, delete "bandwidth;" and insert -- bandwidth. --, therefor.

In Column 4, Line 10, delete "MSG3" and insert -- MSG3. --, therefor.

In Column 4, Line 56, delete "acquisiton" and insert -- acquisition --, therefor.

In Column 5, Line 6, delete "Reject" and insert -- Reject. --, therefor.

In Column 5, Line 37, delete "$K_{RRcenc}$" and insert -- $K_{RRCenc}$ --, therefor.

In Column 5, Line 61, delete "scenario)" and insert -- scenario). --, therefor.

In Column 7, Line 64, delete "a updating" and insert -- updating --, therefor.

In Column 8, Line 36, delete "utilized it" and insert -- utilized --, therefor.

In Column 8, Line 44, delete "a updating" and insert -- updating --, therefor.

In Column 10, Line 66, delete "$K_{RRcint}$," and insert -- $K_{RRCint}$, --, therefor.

In Column 13, Line 4, delete "Reject" and insert -- Reject. --, therefor.

Signed and Sealed this
Tenth Day of May, 2022

Katherine Kelly Vidal
*Director of the United States Patent and Trademark Office*

In Column 13, Line 28, delete "$K_{RRcint}$." and insert -- $K_{RRCint}$ --, therefor.

In Column 13, Line 48, delete "running" and insert -- running. --, therefor.

In Column 13, Line 51, delete "$K_{RRcint}$," and insert -- $K_{RRCint}$, --, therefor.

In Column 13, Line 60, delete "$K_{RRcint}$," and insert -- $K_{RRCint}$, --, therefor.

In Column 15, Line 3, delete "$K_{RRcenc}$" and insert -- $K_{RRCenc}$ --, therefor.

In Column 15, Line 48, delete "a updating" and insert -- updating --, therefor.

In Column 16, Line 8, delete "a updating" and insert -- updating --, therefor.

In Column 16, Line 33, delete "210)" and insert -- 210). --, therefor.

In Column 16, Line 39, delete "a updating" and insert -- updating --, therefor.

In Column 17, Line 24, delete "(MTC)" and insert -- (MTCs) --, therefor.

In Column 17, Line 25, delete "(NB IoT)" and insert -- (NB-IoT) --, therefor.

In Column 17, Line 37, delete "equipped" and insert -- equipment --, therefor.

In Column 17, Line 49, delete "NB IoT" and insert -- NB-IoT --, therefor.

In Column 23, Line 32, delete "manner" and insert -- manner. --, therefor.

In Column 24, Lines 35-36, delete "radio front end circuitry 1690" and insert -- radio front end circuitry 1692 --, therefor.

In Column 25, Line 51, delete "(CPE)." and insert -- (CPE), --, therefor.

In Column 26, Line 39, delete "Radio front end circuitry 1614" and insert -- Radio front end circuitry 1612 --, therefor.

In Column 27, Line 42, delete "manner" and insert -- manner. --, therefor.

In Column 29, Line 34, delete "power source 1733," and insert -- power source 1713 --, therefor.

In Column 33, Line 36, delete "(VNE)." and insert -- (VNEs). --, therefor.

In Column 34, Line 52, delete "embodiments" and insert -- embodiments. --, therefor.

In Column 38, Line 6, delete "according" and insert -- according to --, therefor.

CERTIFICATE OF CORRECTION (continued)
U.S. Pat. No. 11,032,715 B2

In the Claims

In Column 38, Line 50, in Claim 1, delete "A a" and insert -- A --, therefor.

In Column 39, Line 37, in Claim 4, delete "a updating" and insert -- updating --, therefor.

In Column 40, Line 41, in Claim 15, delete "UE; and" and insert -- UE; --, therefor.